(12) United States Patent
Felker

(10) Patent No.: US 10,569,827 B2
(45) Date of Patent: Feb. 25, 2020

(54) BICYCLE DUAL POWER TURNING TRACK, RACK, PINION, AND ONE-WAY BEARING PROPULSION SYSTEM

(71) Applicant: Thomas S. Felker, Paradise Valley, AZ (US)

(72) Inventor: Thomas S. Felker, Paradise Valley, AZ (US)

(*) Notice: Subject to any disclaimer, the term of this patent is extended or adjusted under 35 U.S.C. 154(b) by 54 days.

(21) Appl. No.: 15/484,519

(22) Filed: Apr. 11, 2017

(65) Prior Publication Data

US 2017/0217535 A1 Aug. 3, 2017

Related U.S. Application Data

(63) Continuation-in-part of application No. 14/255,790, filed on Apr. 17, 2014, now Pat. No. 9,580,137.
(Continued)

(51) Int. Cl.
*B62M 1/12* (2006.01)
*B62K 21/12* (2006.01)
(Continued)

(52) U.S. Cl.
CPC ............ *B62M 1/12* (2013.01); *B62K 21/125* (2013.01); *B62M 1/26* (2013.01); *B62M 3/14* (2013.01);
(Continued)

(58) Field of Classification Search
CPC .......... B62M 1/12; B62M 1/26; B62M 17/00; B62K 23/06; B62K 23/08
See application file for complete search history.

(56) References Cited

U.S. PATENT DOCUMENTS 535,256 A 3/1895 Marty
581,985 A 5/1897 Fritz
(Continued)

FOREIGN PATENT DOCUMENTS

DE 8708478 8/1987
DE 102010034035 2/2012
(Continued)

OTHER PUBLICATIONS

Felker, Thomas S., Dual Powered Propulsion System, Patent Cooperation Treaty Application Serial No. PCT/US15/26137, filed Apr. 16, 2015, International Search Report and Written Opinion dated Jul. 10, 2015.

*Primary Examiner* — Tony H Winner
*Assistant Examiner* — Michael R Stabley
(74) *Attorney, Agent, or Firm* — Schmeiser, Olsen & Watts LLP

(57) ABSTRACT

A dual powered propulsion system for use with a human powered vehicle is provided. The system includes a connecting rod with a front end operatively coupled to yoke-connected forearm bars. The system also includes a splitter coupled to a rear end of the connecting rod, wherein the splitter is coupled to a first rack and a second rack that operate with a first and second pinion gear to turn a crank axle. This system supplies rotational power to the crank axle in a single rotational direction as the connecting rod is oscillated up and down and back and forth. Even though a solid connecting rod is used to transfer power from the oscillating forearm bars to the crank axle, the vehicle is steerable to the right or left as a result of the use of a carriage, on rollers, and a turning track operatively connected to the forearm bars.

11 Claims, 17 Drawing Sheets

Related U.S. Application Data

(60) Provisional application No. 62/215,429, filed on Sep. 8, 2015, provisional application No. 62/323,447, filed on Apr. 15, 2016.

(51) Int. Cl.

| | | |
|---|---|---|
| *F16H 31/00* | (2006.01) | |
| *F16H 19/04* | (2006.01) | |
| *F16H 37/12* | (2006.01) | |
| *B62M 3/14* | (2006.01) | |
| *B62M 17/00* | (2006.01) | |
| *F16H 25/04* | (2006.01) | |
| *B62M 1/26* | (2013.01) | |
| *B62M 15/00* | (2006.01) | |

(52) U.S. Cl.
CPC ............ *B62M 17/00* (2013.01); *F16H 19/04* (2013.01); *F16H 25/04* (2013.01); *F16H 31/001* (2013.01); *F16H 37/12* (2013.01); *B62M 15/00* (2013.01)

(56) References Cited

U.S. PATENT DOCUMENTS

| | | |
|---|---|---|
| 619,637 A | 2/1899 | Tucker |
| 690,180 A | 12/1901 | Pierson |
| 2,232,120 A | 2/1941 | Letsch |
| 2,416,092 A | 2/1947 | Ernest |
| 2,510,013 A | 5/1950 | Edgar |
| 3,800,866 A | 4/1974 | Ireland et al. |
| 3,913,945 A | 10/1975 | Clark |
| 3,921,464 A | 11/1975 | Greseth |
| 3,978,919 A | 9/1976 | Fachbach et al. |
| 4,062,401 A | 12/1977 | Rudny et al. |
| 4,136,735 A | 1/1979 | Beck et al. |
| 4,180,130 A | 12/1979 | Beck et al. |
| 4,181,172 A | 1/1980 | Longhouse |
| 4,184,541 A | 1/1980 | Beck et al. |
| 4,329,946 A | 5/1982 | Longhouse |
| 4,524,987 A | 6/1985 | Kim |
| 4,541,647 A | 9/1985 | Braun |
| 4,602,781 A | 6/1986 | La Marsh et al. |
| 4,685,692 A | 8/1987 | Fullilove et al. |
| 4,726,600 A | 2/1988 | Wu |
| 4,861,055 A | 8/1989 | Jones |
| 5,184,838 A | 2/1993 | Becoat |
| 5,246,343 A | 9/1993 | Windsor et al. |
| 5,253,889 A | 10/1993 | Kaminski |
| 5,272,928 A | 12/1993 | Young |
| 5,324,057 A | 6/1994 | Chartrand |
| 5,328,195 A | 7/1994 | Sommer et al. |
| 5,330,218 A | 7/1994 | Escudero |
| 5,332,244 A | 7/1994 | Turner et al. |
| 5,372,374 A | 12/1994 | Hudson |
| 5,390,946 A | 2/1995 | Spicer |
| 5,429,379 A | 7/1995 | Grigoriev |
| 5,501,648 A | 3/1996 | Grigoriev |
| 5,785,336 A | 7/1998 | Jang |
| 5,829,772 A | 11/1998 | Jones |
| 5,881,685 A | 3/1999 | Foss et al. |
| 5,943,986 A | 8/1999 | Kern et al. |
| 6,032,970 A | 3/2000 | Porter |
| 6,068,279 A | 5/2000 | Dion |
| 6,105,985 A | 8/2000 | Cosgrave |
| 6,161,854 A | 12/2000 | Christini et al. |
| 6,161,855 A | 12/2000 | Christini et al. |
| 6,182,991 B1 | 2/2001 | Christini et al. |
| 6,193,253 B1 | 2/2001 | Barnett |
| 6,386,839 B1 | 5/2002 | Chuang |
| 6,406,047 B1 | 6/2002 | Sawyer, Jr. |
| 6,439,592 B1 | 8/2002 | Christini et al. |
| 6,659,724 B2 | 12/2003 | Takeuchi et al. |
| 6,676,371 B1 | 1/2004 | Brown |
| 6,688,623 B1 | 2/2004 | Yunaska |
| 6,827,362 B2 | 12/2004 | Smith et al. |
| 6,986,520 B2 | 1/2006 | Smith et al. |
| 7,021,639 B2 | 4/2006 | Park |
| 7,040,260 B2 | 5/2006 | Yoshimatsu et al. |
| 7,201,389 B2 | 4/2007 | Smith et al. |
| 7,413,206 B2 | 8/2008 | Pena et al. |
| 7,497,806 B2 | 3/2009 | Duncan et al. |
| 7,682,286 B2 | 3/2010 | Badameh et al. |
| 7,698,967 B2 | 4/2010 | Ording |
| 7,752,767 B2 | 7/2010 | Mandaric |
| 7,833,129 B2 | 11/2010 | Badameh et al. |
| 7,870,809 B2 | 1/2011 | Rice |
| 7,891,686 B1 | 2/2011 | Crawford |
| 7,896,375 B2 | 3/2011 | Cynn |
| 7,963,889 B2 | 6/2011 | Badameh et al. |
| 7,967,314 B1 | 6/2011 | Mirabile |
| 8,056,916 B2 | 11/2011 | Hudgin |
| 8,157,280 B2 | 4/2012 | Drymalski |
| 8,172,247 B2 | 5/2012 | Weber |
| 8,181,977 B1 | 5/2012 | Bartlett |
| 8,186,699 B2 | 5/2012 | Green |
| 8,220,578 B2 | 7/2012 | Long |
| 2004/0113384 A1 | 6/2004 | Park |
| 2005/0044981 A1 | 3/2005 | Huang |
| 2007/0114086 A1 | 5/2007 | Glessner |
| 2008/0193286 A1 | 8/2008 | Kakishita et al. |
| 2008/0210409 A1 | 9/2008 | Saksager |
| 2011/0148068 A1 | 6/2011 | Hunt |
| 2012/0272777 A1 | 11/2012 | Tolhurst |
| 2012/0295770 A1 | 11/2012 | Lo |
| 2012/0299267 A1 | 11/2012 | Zacchi |

FOREIGN PATENT DOCUMENTS

| | | |
|---|---|---|
| EP | 91107605.7 | 11/1991 |
| FR | 2686305 | 7/1993 |

BICYCLE DUAL POWER TURNING TRACK, RACK, PINION, AND ONE-WAY BEARING PROPULSION SYSTEM

CROSS REFERENCE TO RELATED APPLICATION[S]

This application is a continuation-in-part of the earlier U.S. Utility patent application entitled DUAL POWERED PROPULSION SYSTEM, Ser. No. 14/255,790, filed Apr. 17, 2014, and claims priority to U.S. Provisional Patent Application entitled DUAL POWER ROTARY ROD PROPULSION SYSTEM, Ser. No. 62/215,429, filed Sep. 8, 2015, and claims priority to U.S. Provisional Patent Application entitled BICYCLE DUAL POWER RACK, PINION, AND ONE-WAY BEARING PROPULSION SYSTEM, Ser. No. 62/323,447, filed Apr. 15, 2016, the disclosures of which are hereby incorporated entirely herein by reference.

BACKGROUND OF INVENTION

1) Technical Fields

The Dual Power invention described herein relates generally to a dual power propulsion system for human power vehicles, and more particularly to the use of a turning track, rack, pinion and one-way bearing propulsion system to permit turning of the vehicle while providing torque to the driving wheel of the vehicle from simultaneous or individual use of the rider's arms and legs.

2) Discussion of Related Art

Human powered vehicles employing many different designs for humans to move vehicles have been developed and used throughout the ages. These types of vehicles have been used in many activities, including but not limited to sports, riding to work or store, movement of goods and passengers in commerce, physical exercise, conditioning, or other task. The types of vehicles that can utilize the benefits of a crank axle and driving wheel powered by both the rider's arms and legs include, but are not limited to: bicycles, tricycles, recumbent bikes and trikes, tandem bicycles, human powered airplanes, human powered helicopters, and water craft.

Current and past variations of combined arm and leg powered vehicles have embraced rotating hand cranks, pumping handle bars "up and down" or "back and forth" over the stem of the bicycle, moving one arm up in one direction and the other arm down in the opposite direction simultaneously, moving both arms up and down simultaneously while pulling-on handle bars, and the use of systems containing rods, rotating cables, gears, and racks connecting movable handle bars to the crank axle. An example of this prior art is U.S. Pat. No. 5,328,195, by Graham Sommer, in which a cable is attached to a moveable handle bar that moves "up and down" in unison with a similar movement of the rider's arms and hands. Because U.S. Pat. No. 5,328,195 uses only an unsheathed push-pull cable by itself to transfer power from the pumping arm bars to the crank axle, the rider's arm power is delivered to the crank axle only during the single condition in which the rider is "pulling-up" on the movable handle bars and thus pulling-up on the cable. U.S. Pat. No. 5,328,195 does not provide an ability for the rider to deliver any power to the crank axle when the rider's forearms and hands are "pushing down" on the movable forearm bars. This is because U.S. Pat. No. 5,328,195 enables only the use of standard push/pull cables, which are not sliding inside a stationary cable sheath. Thus, it only causes power to be delivered in the "Pull" mode, and not in the "Compression" or push mode. Because the cable is moving by itself, and not sliding within a stationary sheath, the rider's downward stroke on the forearm bars is like pushing on a string, and hence no power can be delivered to the forward rotation of the crank axle and driving wheel during the "down" stroke. In fact, U.S. Pat. No. 5,328,195 includes as one of its necessary components, a mechanical re-wind mechanism that automatically re-winds the cable during the compression stroke; this ensures no human power can propel the bicycle forward during the rider's "push" stroke on the push/pull cable's "down" stroke.

A second example of variant prior art is USPTO Publication No. US 2007/0114086 A, published May 24, 2007, by Glessner, et. al., and describes a bicycle with two transmissions powered by two aero bars. In the Glessner publication, he enables his invention with the rider sequentially raising and lowering each aero bar separately, first the left one is pulled-up while the right aero bar is simultaneously pushed down, then the left aero bar is pushed-down while the right aero bar is pulled-up. This is quite different from the current invention in which the rider simultaneously pushes and pulls both the right and left forearm bars up together and then pushes them down together. Glessner also does not reference the need nor the use of employing inverted positioned rack and pinion gears in his drive train.

While some vehicles have had modest acceptance in the marketplace, they have been deficient because they cause excess resistance from friction-loss in the operative component parts, they are clumsy to operate, they only provide energy into the crank axle during the pulling or upward stroke of the handle bars, at high speeds some of the designs cause the rider's control of the bicycle to be unstable.

The purpose of this invention is to remedy all of the afore-described and other deficiencies in the prior art relating to arm power assisted cycling.

SUMMARY OF THE INVENTION

In accordance with the invention, the rider is provided an arm assisted drive train in which the arm-powered drive mechanism provides power to the driving wheel, on demand, and can operate regardless of whether or not the rider is using his legs to rotate the pedals. The invention's components are designed so that the rider enjoys "on demand" Dual Power cycling in a stable and controlled manner through use of his elbows and upper arms to steer the bicycle. This is called 4 Point Steering. Dual Power cycling, in which the rider powers the bike using both his arms and legs, also allows the rider to exercise twice as many muscle groups compared to cycling with just his legs, and allows for a more complete cardio, vascular and muscle tissue work-out.

Briefly, the Dual Power Drive Train consists of the following:

A) The use of two yoke-connected forearm bars rotating on bearings over a fulcrum in a partial arc, and always positioned parallel to the direction of travel of the front wheel. This allows the rider to use his maximum amount of leverage with his forearms, biceps, and shoulders to input energy and torque to rotate the driving wheel.

B) Power rotations of the yoke-connected forearm bars involve the rider moving them in unison in an upward direction to the sky, and then in a downward direction toward the ground. Thus, the rider's yoke-connected forearm bar power movements are always neutral relative to lateral turning of the front wheel.

C) The upper arms and elbows provide four separate control points, and thus 4 point steering. The rider holds his upper arms and elbows in place to both: 1) turn the front wheel and 2) rotationally pump the forearm bars in a partial arc. Thus, in order for the rider to steer the front wheel he must affirmatively move all four control points in unison in order to make the desired turn to either his left or right. The rider can intentionally, simultaneously, and continuously power the bicycle by rotationally pumping the forearm bars in a partial arc while making his turn. In this way, there's no unintended lateral turning of the front wheel of a bicycle or tricycle, which provides the rider with stability and control of the Dual Powered bicycle.

D) A turning track is operatively connected to the underside of the yoke attached to the two forearm bars. A carriage is operatively connected to the head tube, which is attached to frame of the bike. This carriage is directly connected to a telescoping rod, which allows the carriage to move vertically up and down, but does not allow the carriage to move laterally;

E) The carriage also has attached to it several rollers, and even though the turning track moves laterally over them, these rollers remain horizontally stationary because they're attached to the stationary positioned carriage;

F) A raceway on the turning track also comes in contact with the rollers; as the rider steers the forearm bars left or right, the turning track correspondingly and simultaneously rotates with the forearm bars; this is because the turning track rolls over the stationary positioned rollers;

G) Operatively connected to the carriage is a connecting rod, which rotationally moves up and down, as well as back and forth, in unison with the rider's oscillations of the forearm bars. The connecting rod is held in its lateral plane by a guide through which the connecting rod travels;

H) The rear end of the connecting rod has a T fitting, or splitter, attached to it, and one of two racks is connected to each side of the T fitting; one rack is attached to one side of the splitter, and the other rack is attached to the opposite side of the splitter;

I) Two pinion gears are positioned with the teeth of each one's respective rack moving over teeth of its own pinion gear; these pinion gears are positioned in an inverted manner, one to the other;

J) A one-way bearing is attached to each of the two pinion gears, and at the same time is also attached to the outer surface of the crank axle;

K) Thus, as the rider oscillates the forearm bars up and down, the carriage moves up and down in unison with it. The connecting rods contemporaneously move up and down, as well as back and forth, and the two racks also move in unison with the connecting rod;

L) Because the racks are inverted one to the other, with one rack positioned on top of one of the pinion gears, while the other rack is positioned on the bottom of the second pinion gear, and the one-way bearings are positioned between these pinion gears and the crank axle, the crank axle, chain sprocket, chain, and driving wheel are always rotating in the direction that propels the driving wheel and bicycle forward, while the rider rotationally oscillates the forearm bars up and down. Similarly, if one was to reverse the rack and pinion gears, which are inverted as described in the preceding sentence, he would achieve the same result of the crank axle rotating in the same direction to always propel the driving wheel in a forward direction;

M) As a result of the connecting rod being solid or of a tube configuration, the only way to turn the bicycle's front wheel left or right is by disconnecting and separating the associated left or right steering function of the forearm bars and front wheel from the back and forth movement of the solid connecting rod or tube. This is accomplished by attaching a turning track to the forearm bars, and operatively attaching the carriage and its rollers to the bicycle frame. In this way, the carriage rollers, which cannot move left or right, permit the forearm bars to move the turning track left or right, and thus allow the rider to steer the front wheel of the bike left or right, while simultaneously rotating his forearm bars up and down, which also moves the connecting rod back and forth. The back and forth movement of the connecting rod operatively rotates the crank axle to propel the bike forward during a left or right turn;

N) The Dual Power Bicycle described herein is designed to improve many facets involved in the riding of a combined arms and legs powered bicycle, as compared to a bicycle in which the rider uses power only from his legs to rotate the crank axle and driving wheel. Some of these benefits include, but are not limited to: 1) improving the efficiency of the body's lactate uptake by spreading-out over more muscle groups of the body the energy utilized in locomotion of the vehicle, 2) providing a more complete exercise program for the rider's body by utilizing more muscle groups of the body during the ride, 3) permitting the rider to ride the bicycle faster, or pull a greater load, through implementation of additional muscle groups which inputs more energy into the crank axle and driving wheel, 4) permitting the rider to have more efficient usage of the available oxygen in certain parts of his body by spreading it out over more active muscle groups during a given period of riding time than when the rider is using just his legs, thus making a more efficient cardio workout for the rider by engaging both of the rider's upper and lower body muscle groups, and 5) allowing the rider to transfer nearly 100% of his arm power into rotating the drive wheel minus a few percentage points of power (losses) due to friction from general bearings and the two gears.

This invention, and the objects and features thereof, will be more readily apparent from the following detailed description and appended claims when studied in conjunction with the Drawings.

LIST OF THE INVENTION'S COMPONENT PARTS

Component parts of the invention include:
1) Overall bicycle
2) Top tube
3) Down tube
4) Post tube
   4a) Post stay
5) Seat
6) Head tube
7) Turning tube
8) Stem
109) Fulcrum bar
   109a) Forearm bar bearings
110) Forearm bar
11) Left crank
   11a) Left pedal
12) Right pedal 13) Right crank
14) Front chain sprocket
   14a) Second front sprocket
   14b) Third front sprocket
15) Horizontal chain from front sprocket to cassette
   15a) chain stay
16) Rear brake set
17) Rear wheel and tire
18) Front wheel and tire
19) Front forks
120) Hand grips
121) Yoke connecting together the two forearm bars
   121a) Second yoke connecting together the two forearm bars
122) Elbow/forearm holders
   122a) Elbow/forearm bindings
123) Attachment connecting the forearm bar to turning track
   123a) Attachment connecting yoke to turning track
124) Turning track that allows the front wheel to turn left or right while the rider continues to rotationally pump the forearm bars vertically
125) Carriage with rollers and over which the turning track rotates during a turn
   125a) Rollers attached to the carriage, and over which the turning track travels
   125b) Connection attachment between the telescoping rod and the carriage
126) Telescoping rod
   126a) Pin holding bottom of telescoping rod onto head tube bracket
27) Connecting rod between the carriage and rod end bearing attached to the splitter
   27a) Horizontal bridge connecting rod that connects the carriage to the main diagonally positioned connecting that is attached to the splitter on its rear end
28) Guide that holds the connecting rod in a continuous lateral plane
29) Rod end bearing connecting the connecting rod with the splitter
30) Housing that contains and protects the racks, pinion gears, and one-way bearings
31) Splitter
32) First rack that travels under the first pinion gear
   32a) First pinion gear that rotates on top of the first rack
   32b) First one-way bearing positioned between the first pinion gear and the crank axle
   32c) One of two rollers upon which the rack travels, and which keeps the rack traveling over its corresponding pinion gear
33) Second rack that travels on top of the second pinion gear
   33a) Second pinion gear that rotates below rack 33
   33b) Second one-way bearing positioned between second pinion gear and crank axle
   33c) One of two rollers upon which the rack travels, and which keeps the rack traveling over the pinion gear
34) Crank axle housing
35) Crank axle
36) One of two bearing sets over which the crank axle rotates inside the crank axle housing

BRIEF DESCRIPTION OF THE DRAWINGS

FIG. 1 is an oblique view of Configuration I showing a road bike that has installed on it the Dual Power invention with a rack and pinion propulsion system;

FIG. 2 is an oblique illustration of Configuration I showing the forearm bars, turning track, and carriage, wherein this illustration is taken from a left rear view of the bike;

FIG. 3 illustrates Configuration I showing the connecting rod, splitter, racks, pinion gears, and rollers that are positioned around the crank axle;

FIG. 4 is a cut-a-way view of Configuration I from FIG. 3A showing the racks, pinion gears, one-way bearings, rollers, and crank axle;

FIG. 5 is an illustration of Configurations I, II and III showing the elbow platforms and holders used to hold the elbows in a stationary position.

FIGS. 7a-1, 7a-2, 7a-3, and 7a-4. Each position is representative of the forearm/hand bars being pulled-up and pushed down in rotational power strokes by the rider as he provides Dual Power to the crank axle and driving wheel during a full 360 degree rotation of the crank;

FIG. 13 is a front side diagonal view of the left side of the Dual Power bicycle in Configuration III format, and shows the Middle Drive System 300 drive train partially consisting of a rotating horizontal drive line that is positioned from the crank on its front end, traversing through a gap between the crown of the forks and the top of the front tire, and connecting-up with a bevel gear inside the top of the down tube;

FIG. 14 is a left frontal oblique view primarily of the components used in the Upper Front Drive System 100 and 200, and for which such parts are similar for application on both Configurations II and III;

FIG. 15 is an oblique view of Configuration III taken from a left rear location of the front of the Dual Power bike, and shows many of the component parts used in Upper Drive System 100 and Middle Drive System 300. It also shows some housings for component parts used in the Drive Train for Configuration III;

FIG. 16 is a cut-away view of Middle Drive System 400 as designed and used in Configuration III of the Invention. The parts include the hub and its internal gears located in front of the upper set of bevel gears, two bevel gears positioned inside and near the top of the down tube, a diagonally positioned drive line, and a second set of bevel gears located at the intersection of the down tube and the crank axle housing. All of these parts are located inside the down tube;

FIG. 17 illustrates component parts used in Lower Drive System 400, which are used in Configuration III. These parts include the crank axle and its bearings, and pedal cranks.

DETAILED DESCRIPTION OF EMBODIMENTS OF THE INVENTION

I. Embodiments of Configuration I

Figure 1:
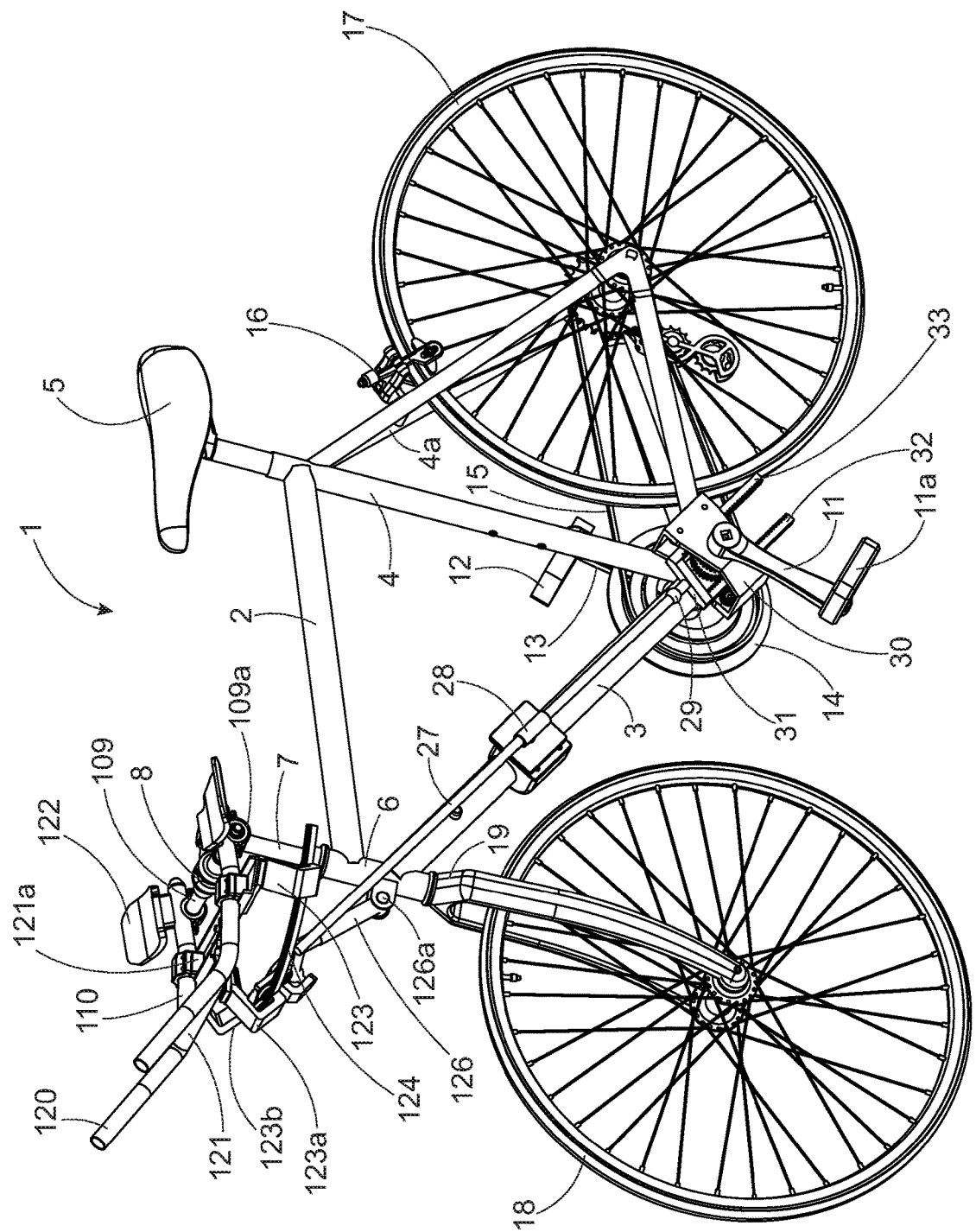
FIGS. 1 through 5 are illustrations of various views of Configuration I showing a dual power rack and pinion gear and propulsion system; 6 through 12 are illustrations of various views of different component assemblies for Configuration II of the Dual Power Bike.

In the following description and accompanying drawings, like numbers refer to like parts whenever they occur. In addition, while the following enablement refers to many component parts for Configuration I of the invention operating at specific positions within the overall Dual Power drive system, some of these parts may be shifted to different locations within the overall drive system, and still maintain complete functionality of the Dual Power drive system. An example of this is with rack 32, which in the current design is positioned underneath pinion gear 32a, it could also be positioned on top of pinion gear 32, and operate just as well. Of course if this design change is implemented, then rack 33 would need to be re-positioned and located under pinion gear 33a. (See FIGS. 3 and 4)

A. Dual Power Drive Train for Configuration I

Figure 7:
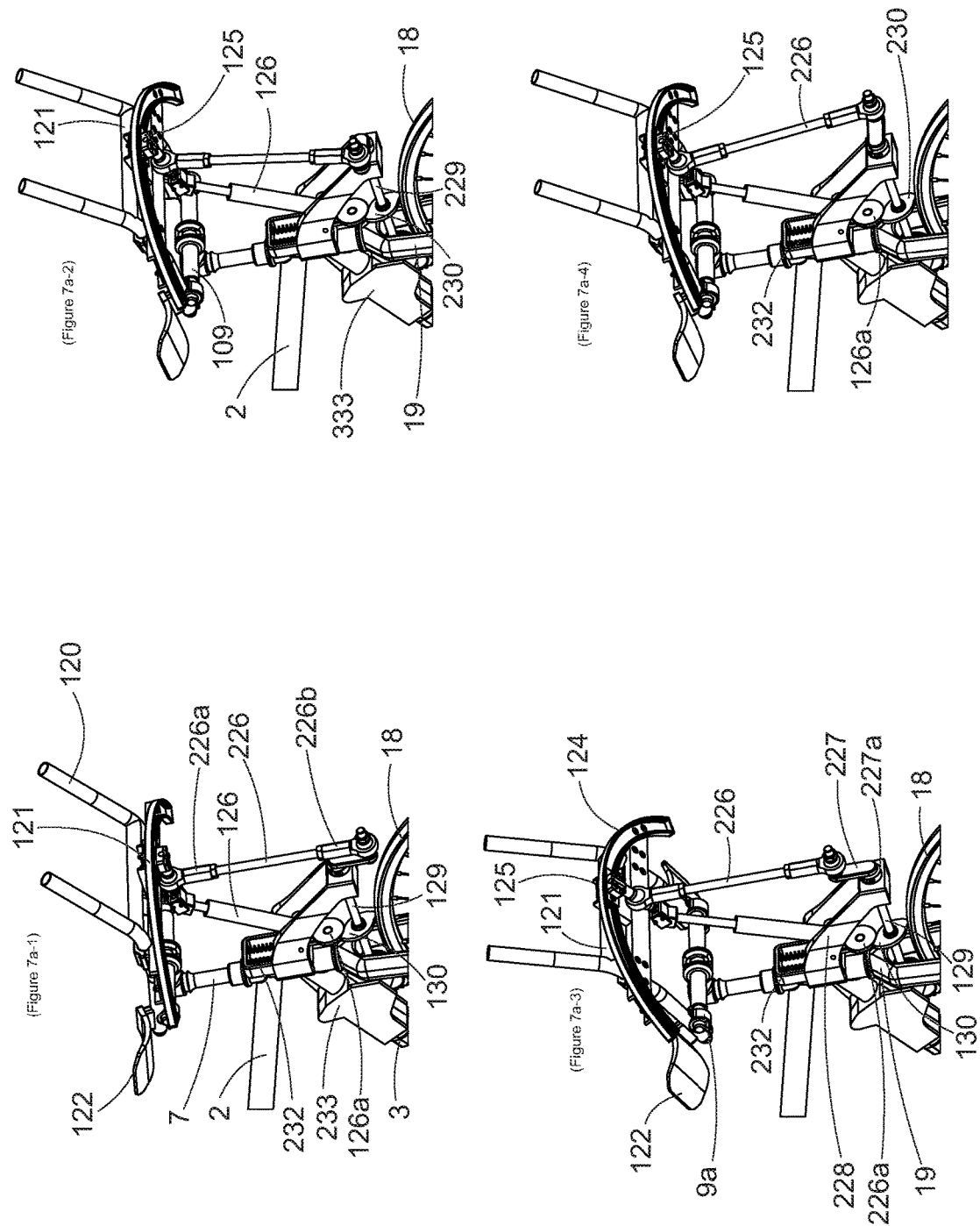
FIG. 7 illustrates the Dual Power forearm/bars in four different positions.
Figure 8:
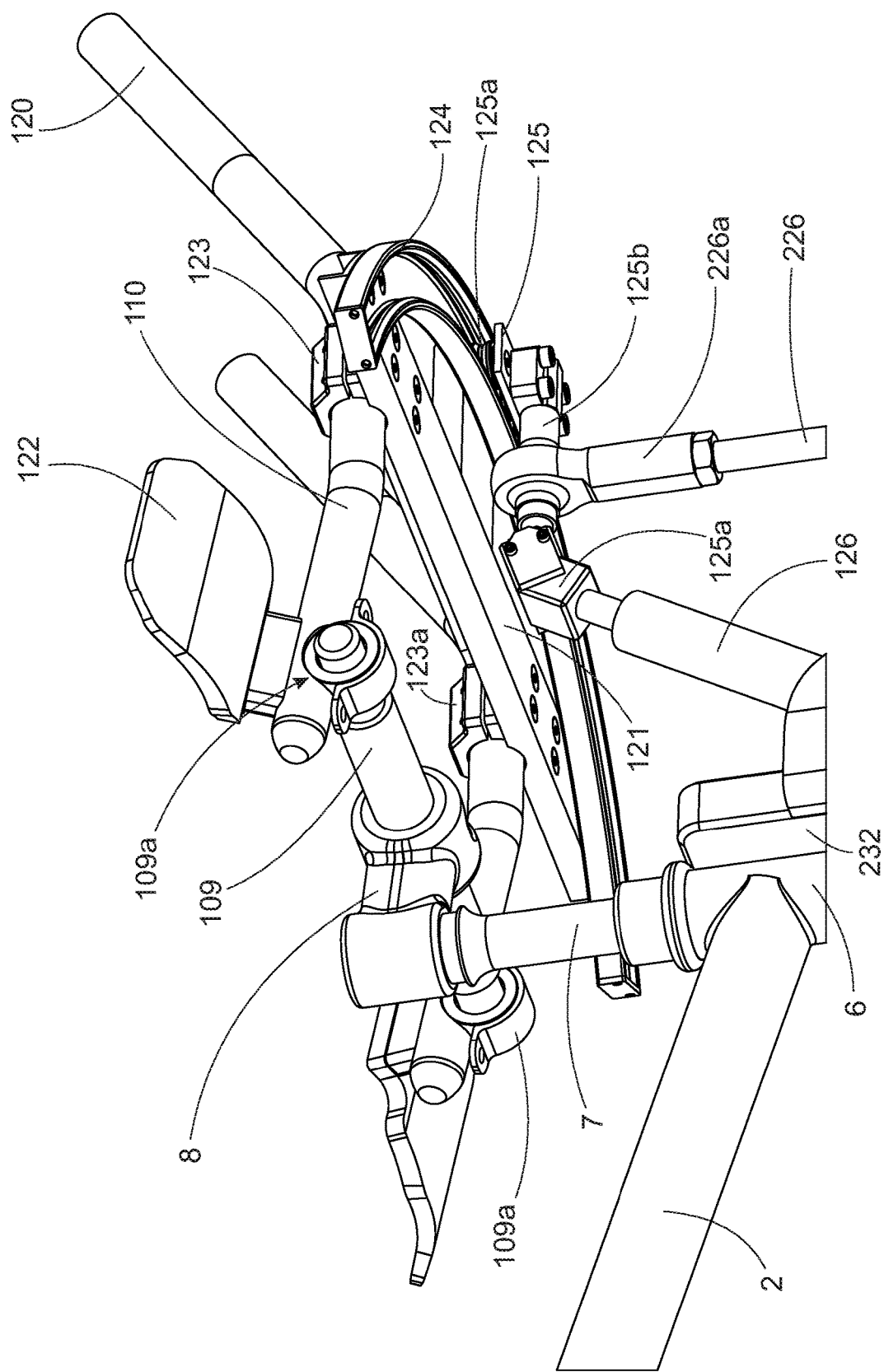
FIG. 8 is an oblique perspective view of Configuration II and III from the right rear location of Upper Drive System 100, showing the fulcrum rod, "On Demand" forearm/hand bars, turning track attached to the underside of the forearm/hand bars, and which also acts as a yoke to connect them together. Other parts include the telescoping rod, connecting bridge rod, and rollers inside the turning track, and carriage.
Figure 9:
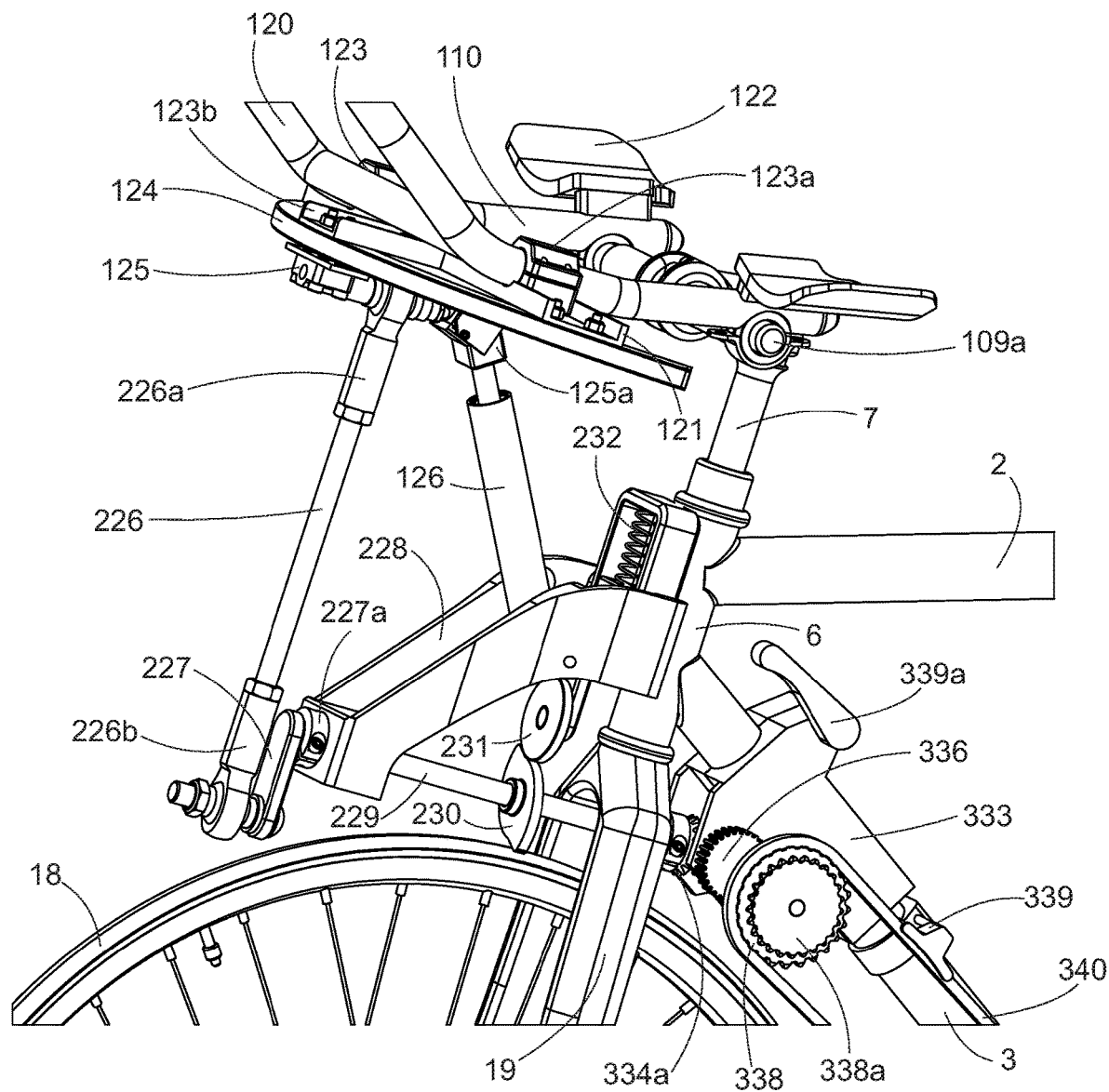
FIG. 9 is an oblique perspective view of Configuration II looking toward the upper left front of the Dual Power bike, and illustrates the positioning of the horizontal drive line connected to the crank on its front end, then traversing through a gap between the top of the front tire and the crown in the forks, and connecting on its rear end with the front bevel gear located at the top of the down tube. It also shows the bevel gears, spur gears, sprockets and chain.
Figure 10:
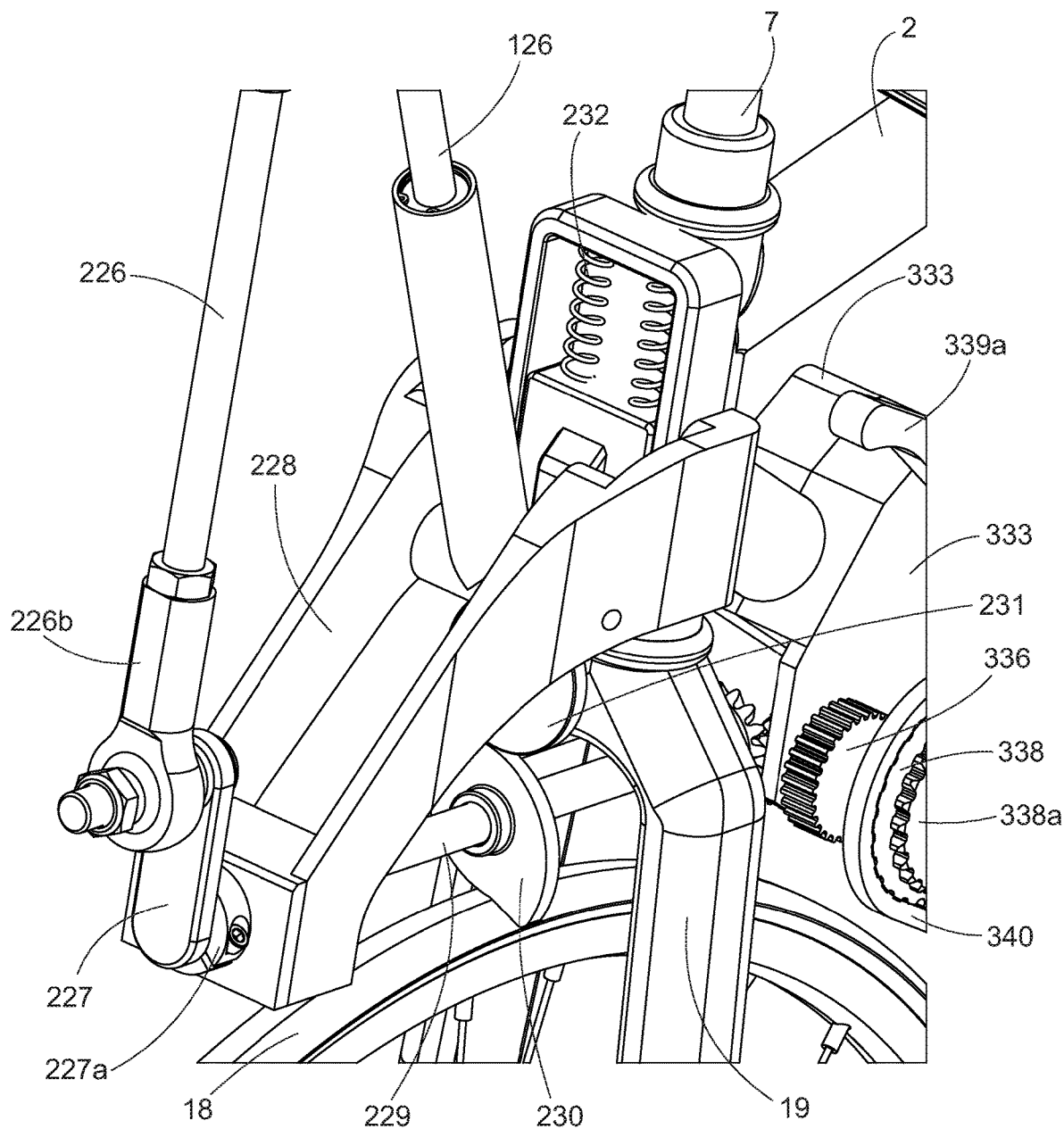
FIG. 10 is a perspective view of Configuration II from the left front of the Upper Drive System 100. In this illustration the cam, cam follower, and spring loaded bracket attached to the cam follower are shown. They are positioned on the front of the bike near the head tube and ahead of any gears that may be a part of the Dual Power drive train. Also shown are the telescoping rod, upper front crank, connecting bridge rod, and horizontal drive line.

The Dual Power Bicycle consists of bicycle frame 1, and has attached to its turning tube 7 and stem 8, a perpendicularly mounted fulcrum rod 109. This fulcrum rod 109 serves two purposes, a) provides the rider with the ability to steer the front wheel 18 of bicycle 1 with his elbows and upper arms by causing the turning tube 7 to naturally steer right or left when he turns it 7 with his upper arms and elbows on the forearm bars 110 and elbow holders 22. The rider accomplishes a left turn by pushing his right elbow and upper arm forward, and pulling-back with his left elbow and upper arm. A right turn is accomplished by reversing the preceding directions with his elbows and upper arms. Because the forearm bars 110 are attached to the fulcrum rod 109 with bearings 109a, this permits the rider to simultaneously input muscle generated power from his biceps, forearms, and shoulders into torque that rotates the crank axle 35. Torque is created when the rider rotationally pumps "up and down" the forearm bars 110 at a rate as fast or faster than the rider is turning the crank axle 35 from pumping the pedals 11a and 12 with his legs. The fulcrum rod 109 has on each end a bearing 109a, and attached to each of these bearings 109a is the rear end of one of two forearm bars 110. Thus, as the rider "pulls-up and pushes-down" on the hand grips 120 of forearm bars 110, the rear end of each of these forearm bars 110 pivots on fulcrum rod 109 and bearings 109a, causing a cyclical angular displacement of the forearm bars 110 as they rotate lineally along the path of an arc. (See FIGS. 1, 2 and 7)

Figure 5:
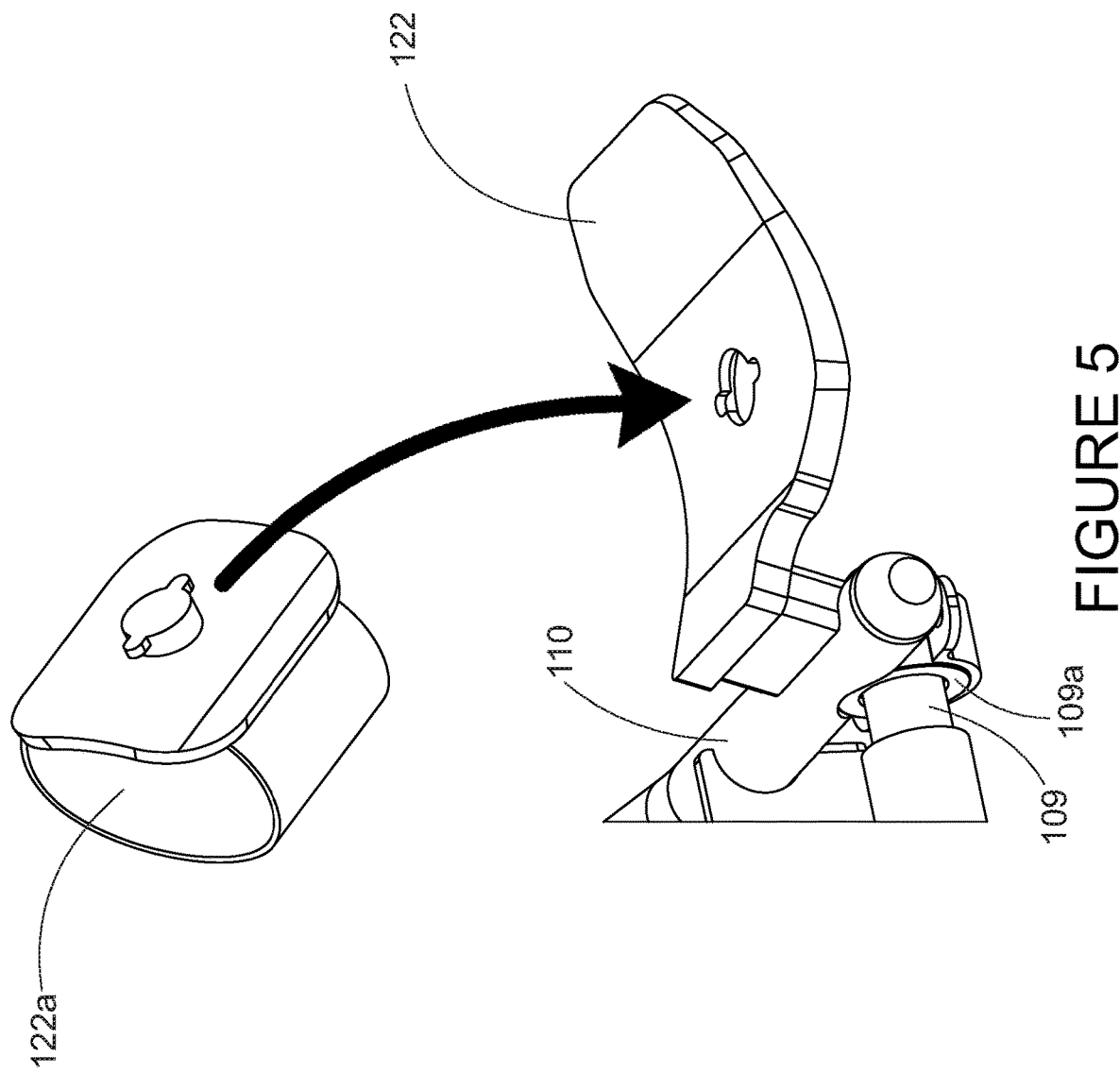

If the rider is going to use vigorous power during the down stroke of the forearm bars 110, then it is useful for him to use the forearm/elbow bindings 122a as illustrated in FIG. 5. In this situation, before riding the Dual Power Bike 1, the rider will first attach the bindings 122a onto his forearm and elbows. Then the rider pushes his bindings 122a into the receiving hole in platforms 122 so that they 122a are not loose. The rider then commences his rotational up and down power strokes with the forearm bars 110. Unless the rider uses the bindings 122a to fasten his elbows and forearms into the platforms 122, then when he is vigorously pushing down with his hands and forearms during the down stroke, his elbows and forearms may lift off of the platforms 122. This condition may result in less power being delivered into the crank axle 35. The bindings 122a may be quick release bindings 122a coupled to the elbow platform 122, wherein the quick release bindings 122a are configured to releasably couple a rider's elbows to the elbow platform 122.

The forearm bars 110 are connected together with two yokes 121 and 121a. The function of yokes 121 and 121a is to tie together the two forearm bars 110 so that they can only move together in unison, one with the other, rotationally "up and down", or be steered in unison left or right. Thus as the rider grips hand grips 120, and rotationally pumps forearm bars 110 "up and down" in a complete cycle, this function causes the turning track 124 and carriage 125 to also rotationally oscillate up and down; simultaneously connecting rod 27 moves in unison with them both up and down as well as back and forth. (See FIGS. 1, 2, and 3)

Attached to turning track 124 is a carriage 125. Carriage 125 is attached to turning track 124 through rollers 125a. The carriage 125 and rollers 125a are operatively coupled to the frame with telescoping rod 126. Telescoping rod 126 allows the carriage 125 and rollers 125a to move vertically while prohibiting movement side to side. Thus, as the rider steers the forearm bars 110 to either the left or right, he is simultaneously rotating turning track 124 as well as the turning tube 7, and thereby steering the front forks 19 and front wheel 18 to the left or right. Because the carriage 125 and rollers 125a are held horizontally stationary, the carriage 125 and rollers 125a permit the turning track 124 to roll over the rollers 125a, while also allowing the rider to rotationally pump the forearm bars 110 vertically, which is operatively inputting power into the driving wheel 17 and moving the bicycle forward. (See FIGS. 1 and 2)

A horizontally positioned connecting rod 27a is attached to carriage 125 on one end, and on its opposite end, it 27a is attached to the front end of the diagonally positioned connecting rod 27. Thus, as carriage 125 is rotationally moved up and down by the rider oscillating the forearm bars 110, the horizontal connecting rod 27a is also rotationally moved up and down. This causes connecting rod 27 to simultaneously move both up and down as well as back and forth.

These components serve two purposes, the first is to provide the rider with four point steering, which the rider uses to make any turn to his right or left by simply turning in unison both his forearms and hands in the desired direction. Four point steering of the forearm bars 110 uses four separate human touch points to steer the front wheel 18. The four human touch points are: 1) left forearm/elbow, 2) right forearm/elbow, 3) left hand and 4) right hand that are all placed onto the forearm/hand bars 110 and grips 120, respectively. Thus, in order for the rider to steer the front wheel 18 he must affirmatively and simultaneously move all four touch points in unison toward the direction of his desired turn to the left or right.

Normally the use of a solid drive line 27 in Configuration I would preclude the rider from being able to turn the bicycle 1 to the right or left. This is because the solid drive line 27 is inputting power to the crank axle from the oscillating forearm/hand bars. In order to input this power, it 27 cannot be flexible. This problem can be overcome by separating and making independent the turning function from the forearm/had power function. This is accomplished by use of the turning track 124 affixed to the forearm/hand bars, carriage 125 affixed to the rollers 125a, these rollers permitting the turning track to roll over the carriage during a turn, telescoping rod 126 affixed to the head tube 7, and connecting rod 27 operatively connected to the crank axle.

Figure 2:
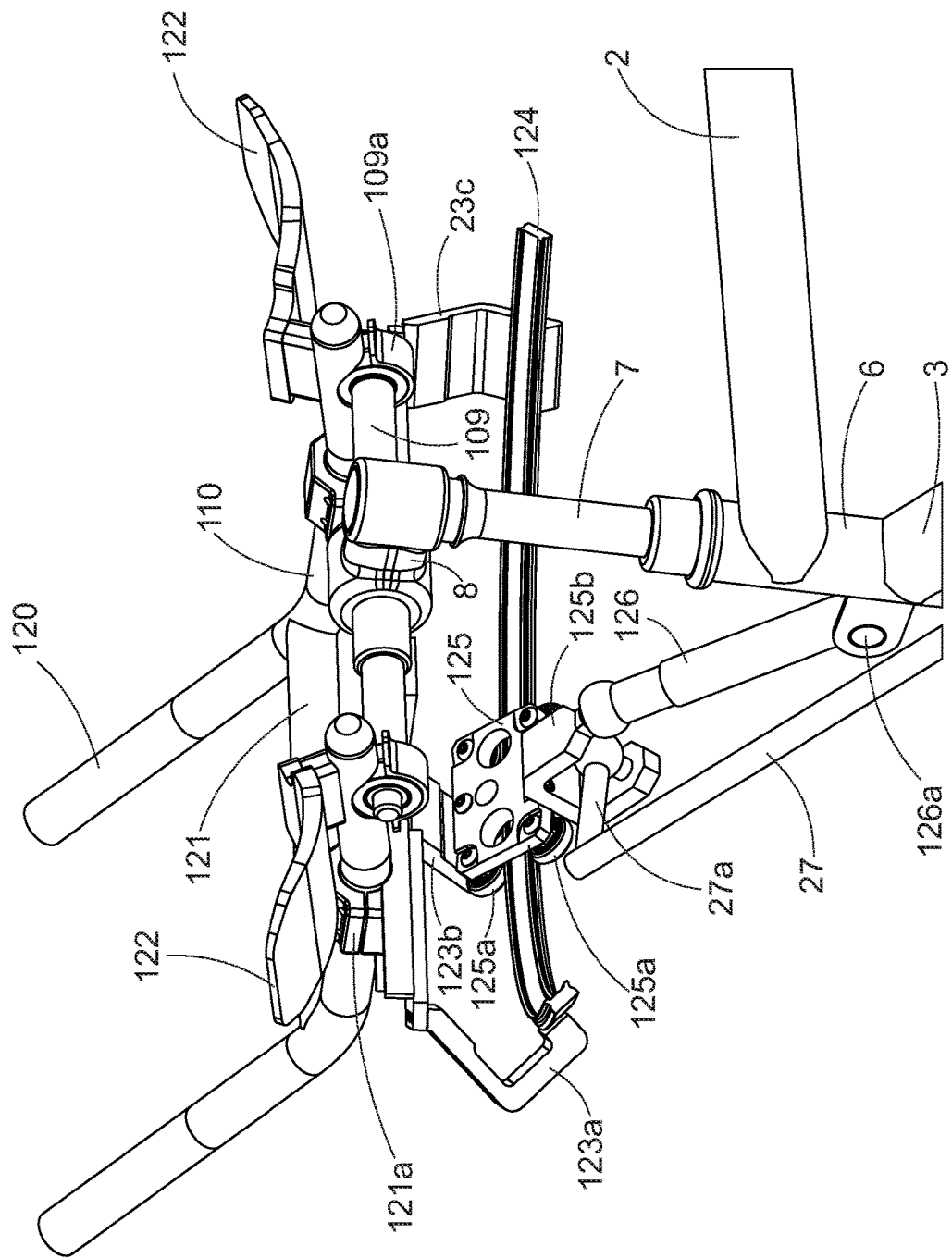
Figure 3:
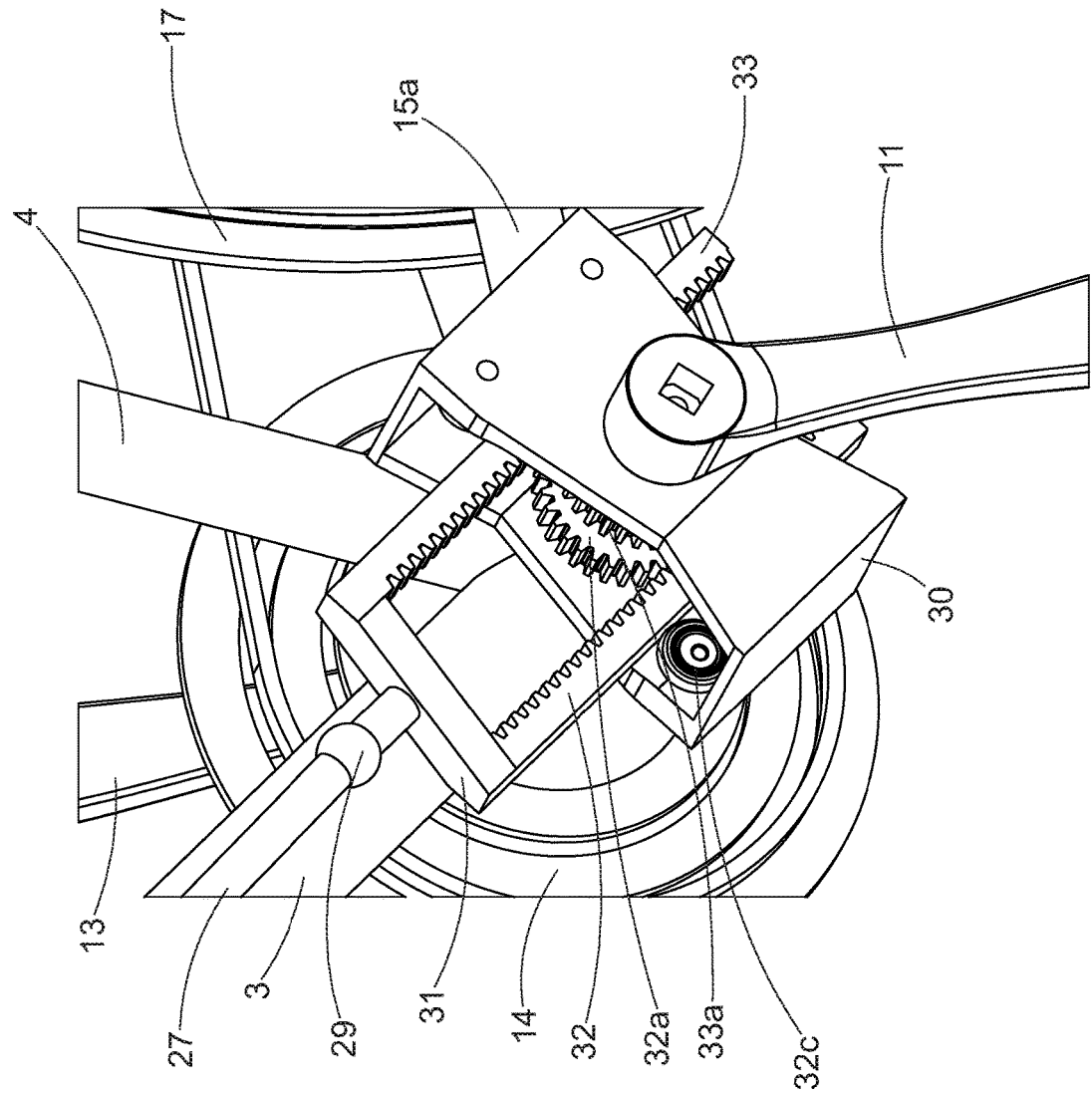

The rear end of connecting rod 27 is connected to splitter 31, which is in turn connected to racks 32 and 33. The geometric positioning of these parts, as shown in FIGS. 1 and 3, cause racks 32 and 33 to oscillate back and forth in reaction to the rider rotationally moving his forearm bars 110 up and down (See FIGS. 1, 3, and 4). One of the racks, in this example rack 32, is mounted below its corresponding pinion gear 32a. The second rack 33 is mounted on the top of its corresponding pinion gear 33a. Because rack 32 is mounted below its corresponding pinion gear 32a, and rack 33 is mounted on top of its pinion gear 33a, when the splitter 31 is pulled and pushed back and forth by the connecting rod 27, the pinion gears 32a and 33a rotate in opposite directions, one from the other. However, each pinion gear 32a and 33a rides on a one-way bearing, 32b and 33b, respectively. Thus crank axle 35 is always rotating in one single direction, which will continuously and operatively rotate driving wheel 17, so long as the rider is oscillating forearm bars 110 at a rate that is as fast or faster than he is pedaling his legs. (See FIGS. 1, 3, and 4)

Because one-way bearings 32b and 33b, respectively, are positioned between crank axle 35 and pinion gears 32a and 33a, the one-way bearings 32b and 33b allow the rider to enjoy "on demand" Dual Power bicycling. This occurs as a result of the fact that each one-way bearing 32b and 33b must be rotated by its respective pinion gear 32a and 33a at a rotational rate that is equal to or greater than the revolutions per minute which the rider is pedaling the crank axle 35 with his legs. (See FIGS. 1, 3, and 4) Thus, so long as the rider is rotationally oscillating his forearm bars 110 at a rate that causes the pinion gears 32a and 33a, along with their respective one-way bearings 32b and 33b, to rotate at a faster rate than the rider is pedaling with his legs, the forearm bars 110 will be continuously and singularly rotating the crank axle 35 and driving wheel 17 in the same forward direction. If the rider is rotationally oscillating the forearm bars 110 at a rate that is equal to the RPM at which he is rotating pedals 11a and 12 to turn crank axle 35, then torque will be derived from the rider's forearms, biceps, and shoulders, as well as his legs, to rotate the crank axle 35 and driving wheel 17. And finally, if the rider's legs and pedals 11a and 12 are rotating crank axle 35 at a faster rate than he is oscillating his forearm bars 110 to rotate the crank axle 35, then all the power that provides torque to turn crank axle 35 will be coming from the rider rotating just his legs. (See FIGS. 1, 2, 3, and 4)

The connecting rod 27 is held in its vertical plane by virtue of it 27 traversing through a guide 28, that is attached to the down tube 3. This guide 28 controls the path of lateral travel by precluding the connecting rod from being able to move laterally away from the down tube 3.

A set of rollers 32c and 33c, are attached to housing 30, and positioned on the bottom and top of their respective racks 32 and 33. The roller sets 32c and 33c cause the teeth of their respective racks 32 and 33 to be continuously meshed into the teeth of their respective pinion gears 32a and 33a. Thus, even though racks 32 and 33 are moving back and forth over their respective pinion gears 32a and 32a, the rollers 32c and 33c, respectively, are held stationary because of their 32c and 33c attachment to the stationary housing 30. This causes the racks, 32 and 33, to just roll over the rollers 32c and 33c, respectively, as their 32 and 33 teeth, which are meshed into the teeth of pinion gears 32a and 33a, respectively, rotate their respective pinion gears 32a and 33a. The inverted rotation of pinion gears 32a and 33b cause their respective one-way bearings 32b and 33b to cause crank axle 35 to continuously rotate in only the forward direction as a result of the rider rotationally oscillating his forearm bars 110. (See FIGS. 1, 2, 3, and 4) This condition will be operative so long as the rider is oscillating his forearm bars 110 at a rate that causes the crank axle 35 to rotate as fast as or faster than the rider is pedaling the crank axle 35. In additional embodiments, as shown in FIG. 3B, set of rollers 32c and 33c may be replaced with rack support casings 32d and 33d respectively. Rack support casings 32d and 33d support racks 32 and 33 respectively as they travel over the pinion gears 32a and 33a.

II. Embodiments of Configurations II and III

According to embodiments, the function of the rider simultaneously using both his arms and legs, prosthetic or otherwise, to input torque into the driving wheel is called Dual Power. The components of this invention are designed so that the rider enjoys Dual Power bicycling in a stable and controlled manner through use of 4-point steering. He can reduce his exercise time by up to 40%, because he is using both his upper and lower body muscles. The rider can also increase his speed as a result of inputting more torque into the driving wheel.

The use of two yoke-connected forearm/hand bars rotating over a fulcrum rod in a partial arc, and always positioned parallel to the direction of travel of the front wheel, allows the rider to use his maximum amount of leverage with his forearm/hand bars, shoulders, and upper body to input energy and torque into rotating the crank axle. This torque is then transferred to the driving wheel through application of currently used bicycle sprockets and chains.

Rotation of the yoke-connected forearm/hand bars starts and ends with the rider moving them in an upward direction toward the sky, and then in a downward direction toward the ground. Thus, the rider's yoke-connected forearm/hand bar power movement is always neutral relative to a lateral steering of the front wheel. Many examples of prior art operate from a sequential pushing or pulling on one side of the handle bars and then the other side, which can lead to an unwanted and unsafe steering of the front wheel.

Four point steering of the forearm/hand bars provides four separate human touch points to steer the front wheel. They are: 1) left elbow, 2) right elbow, 3) left hand and 4) right hand are all placed onto the forearm/elbow bars and handgrips. This is their riding position while the rider is a) steering the front wheel and b) rotationally pumping the forearm/hand bars together in the same up and down direction to input power to the crank axle. Thus, in order for the rider to steer the front wheel he must affirmatively and simultaneously move all four touch points in unison toward the direction of his desired turn to the left or right. In this way, there is no unintended lateral steering of the front wheel of the cycle, unless the rider chooses to intentionally make a turn and affirmatively does so.

The Dual Power Bicycle described herein is designed to improve many facets involved in the riding of a combined arms and legs powered bicycle. Some of these improved facets include, but are not limited to: 1) improving the efficiency of the body's lactic acid uptake by spreading-out over more muscle groups of the body the energy utilized in locomotion of the vehicle, 2) providing a more complete cross-training exercise program for the rider's body by utilizing more upper body muscle groups during the ride, 3) permitting the rider to ride the bicycle faster—or pull a greater load—through the implementation of additional muscle groups to input more energy into the crank axle and driving wheel over a given amount of time, and 4) permitting the rider to have a more efficient usage of the available oxygen in certain parts of his body by spreading it out over more active muscle groups during a given period of riding time than when the rider uses just his legs, and 5) making a more efficient cardio and respiratory workout for the rider by engaging both of the rider's upper and lower body muscle groups and burning more calories during a set amount of time. Because the rider is more efficiently using his cardio and respiratory systems together, he can spend less time on the bike to satisfy these exercise requirements.

A. Parts Used in Configurations II and III

List of the Invention's Component Parts in addition to the component parts listed previously:
1) Basic Parts used in most all standard bikes are denominated as parts 1-8, 11, 11a, 12, 13, 14, 15, 16, 18, and 19 in this Application and are not unique to the current invention;
2) Parts that are in the 100 series of numbers describe those components within the Upper Drive System 100, and these same components are used for all 3 Configurations I, II and III. The parts in the Upper Drive System 100 are numbered 109, 109a, 110, 120, 121, 122, 123, 123a, 123b, 124, 125, 125a, 125b, 126, and 126a;
3) Component parts used in the Upper Front Drive System that are used in both Configurations II and III are numbered 226, 226a, 226b, 227, 227a, 228, 229, 230, 231 and 232.
   a. Parts used in the Middle Drive System for Configuration II are designated in the 300 series, and they include numbers 333, 334a, 334b, 335, 336, 337, 338, 338a, 339, 339a, 340, 341, and 342;
   b. Parts used in Middle Drive System and found in Configuration III are designated as Series 400, and they include numbers 443, 444, 445a, 445b, 446, 447, 448a, 448b, 449a, and 450;

The part number and nomenclature for such parts are as follows in this list of component parts shown in the Drawings illustrating this invention for Configurations II and III:

15) Right Chain Rear Sprocket, Derailleur, and Cassette
  a) Chain Stay
110) Pumping Forearm/Hand Bars;
120) Forearm Bar Hand Grips attached to front end of forearm/hand pumping bars;
121) Yoke and attachment connecting yoke to forearm bars;
  121a) Yoke and attachment brackets connecting yoke to forearm bars;
122) Forearm/Elbow Support Platforms;
  123a,b,c) Brackets connecting the Turning Track to the Forearm Bars;
124) Turning Track;
125) Carriage inside Turning Track;
  a) Carriage's support rollers;
  b) Horizontal connection rod between carriage and top end of telescoping rod;
126) Telescoping Rod;
  126a) Pin connecting telescoping rod to the head tube;
226) Oscillating vertical connecting bridge rod between the carriage and upper front crank, and may have telescoping capability;
  a) Upper universal rod end bearing connecting upper end of upper front vertical bridge rod to horizontal rod;
  b) Lower universal rod end bearing attached to lower end of upper front vertical connecting bridge rod to outer end of upper front crank;
227) Upper Front Crank
  a) Upper front crank bearing;
228) Bracket holding in place the crank and crank bearing, and that is attached to the head tube;
229) Horizontal Solid rotating drive line attached to the upper front crank on its front end, then traveling under and through the crown of the forks, and attaching on its rear end to a set of bevel gears mounted on the down tube;
230) Cam—The cam may be shaped in a generally elliptical shape, and its shoulders are generally located 180 degrees apart. The purpose of the cam and cam follower is to push the crank over its top and bottom dead center, which are normally at the zero and 180 degree marks;
231) Cam follower—The cam follower is circular in shape and rotates directly over the circumferential surface of the cam. The cam follower is attached to a set of springs that contract and expand with the rotation of its cam, and thus provide the force necessary to push the flywheel across its top and bottom dead center locations;
232) Cam Follower Spring Mechanism—springs may be indirectly attached to the Cam Follower through this mechanism. The compression and expansion of these springs force the cam follower to be in contact with and ride the circumferential surface of the cam. The purpose of them is to provide sufficient downward force on the cam follower to cause it to push and rotate the cam, and thereby the flywheel, over both its top and bottom dead center positions;
333) Transmission Housing located at the top of the down tube and holds in place the set of bevel gears, spur gears, and upper front sprockets;
334) Bevel gear set located between the rotating horizontal rod and the upper front sprocket of the chain or belt;
  a) Bevel gear (a) mounted on the end of the rotating horizontal rod;
  b) Bevel gear (b) mounted perpendicular to bevel gear (a), and whose axle is connected on its opposite end to spur gear (a);
335) Axle connecting bevel gear (b) to spur gear (a);
336) Spur gear (a);

337) Spur gear (b);
338) Mid-level chain or belt sprocket;
   a) Second alternative upper front sprocket used in the design wherein the Dual Power drive system is fitted with multiple sprockets for varying the rate of oscillations per minute for the rider's rotational up and down strokes of the forearm/hand bars;
339) DeRailleur set that will move the Dual Power drive chain or belt from one upper front sprocket to another in order to permit the rider to vary the rate of oscillations per minute of his rotational up and down movement of the forearm/hand bars;
   a) Lever to cause the derailleur to move the chain from one sprocket to another;
340) Chain or belt connecting the upper front sprocket to the lower rear sprocket;
341) Lower rear chain/belt sprocket which is attached to the crank axle;
342) One-way bearing—The inner race of the one-way bearing is mounted upon the lower rear axle, and in Configuration II, its outer race is attached to the lower rear sprocket. Its purpose is to permit the rider to have "on demand" control of inputting Dual Power into the bicycle's driving wheel through the rotational pumping his forearm/hand bars.
443) Cover for the orifice located in the underside of the down tube and into which the horizontal rotating power rod enters the interior of the down tube;
444) Front bearing set supporting the rear end of the horizontal power rod at the location where orifice in the down tube where the horizontal power rod enters the underside of the down tube;
445 a and b) Bevel gear set whose axles are positioned diagonally one to the other. They're located just inside the orifice where the horizontal power rod enters the underside of the down tube. These two bevel gears are meshed together and transfer torque from the rotation of the horizontal power rod into torque to rotate the diagonally positioned rotating power rod located inside the down tube;
446) Diagonally positioned rotating drive line inside the down tube;
447) Collar and bearing surrounding the upper end of the diagonally positioned rotating rod and provides horizontal support for the rotating power rod located between the interior side walls of the down tube;
448 a and b) Set of bevel gears located at the junction of the base of the down tube and the crank axle. Bevel gear 348a is attached to the lower end of the diagonally positioned rotating power rod, and is meshed with bevel gear 348b. This bevel gear is attached directly to the crank axle, and provides torque to it from power generated from the rider pumping his forearm/hand bars;
449) Hub, with internally mounted gears, positioned inside the down tube, and located in front of the upper bevel gear set;
   a) Lever to move gears inside Hub 349;
450) One-way bearing located between bevel gear 348b and crank axle 35;

III. Additional Embodiments of the Invention

In the following description and accompanying drawings, like numbers refer to like parts whenever they occur. In addition, while the following Enablement refers to many component parts of the invention operating at specific positions within the overall dual power drive system, some of these parts may be shifted to different locations within the overall drive system, and still maintain complete functionality within the Dual Power drive system. An example of this is with the positioning of the cam and spring-loaded cam follower, wherein they are placed in front of the head tube in this Enablement of the invention, but to someone knowledgeable and skilled in the art, will recognize that they can be placed on the lower crank axle and still have the cam and cam follower force the upper front crank over its top and bottom dead center positions.

There are two configurations for the additional embodiments of the invention, Configurations II and III. The differences between them is that in Configuration II, there is a sprocket 338 and chain 340 that traverses along the exterior side of the down tube 3 and drives the crank axle 35; however in Configuration III, a rotating solid drive line 446 is located inside the down tube 3, and substitutes for the chain 340 to transfer torque from the top of the down tube 3 to drive the crank axle 35 from power provided by the rider rotationally pumping the forearm/hand bars 110 up and down. The invention also allows the rider to use his upper body muscles by rotationally pumping the forearm/hand bars 110, in conjunction with employing his lower body muscles, by pumping his legs on the pedals 11a and 12; or the rider can use just his lower body muscles by pumping his legs on the pedals 11a and 12 and not moving his upper arms. Thus the rider reduces his cardio and respiratory exercise time while simultaneously building-up the muscle mass in his arms, shoulders and upper back. These continuous and unified forearm/hand power strokes cause the rider to efficiently exercise and build muscle mass in his upper body muscles while simultaneously exercising his legs. Consequently, the Dual Power drive train can cut the rider's exercise time up to 40%, and provides a low impact upper body exercise format to allow disabled people to exercise their whole body riding the cycle 1 at the same time. This drive train also allows the rider to input more torque into the crank axle 35 by using both his upper body and lower body muscles simultaneously which can result in faster speeds and hauling more pay load.

In both Configurations II and III, the description of the Dual Power drive train is divided into four basic segments, they are: a) Upper Front Drive System 200 with all of the 200 series parts being used in both Configurations II and III, b) Middle Drive System 300 (Middle Drive Parts used only in Configuration II), and Middle Drive System 400 (Middle Drive Parts used only in Configuration III). A general summary for Configuration III is:

1) The Dual Power cycle uses a pair of forearm/hand bars 110 which the rider rotationally pulls-up and pushes-down together, in unison, and in power strokes, to create and deliver torque to the lower crank axle 35, in conjunction with the rider rotating his legs/pedals 11a and 12;
2) The rider can also ride his cycle using only his legs to rotate the pedals 11a and 12 and lower crank axle 35;
3) Yokes 121 and 121a connect the two forearm/hand bars 110, so they move in unison together and in the same direction; these yokes 121 and 121a are also the attachment points for fastening the upper front end of the connecting bridge rod 126 to the forearm/hand bars 110, and attaching turning track 124 to the forearm bars 110;
4) The rear end of the forearm/hand bars 110 are connected to a fulcrum bar 109 with a set of bearings 109a. The top of the back end of each forearm/hand bar 110 has a platform 122 attached to it, which provides stability, and support for the rider's elbows to rest, while leveraging the use of muscles in his shoulders and arms to create and deliver maximum upper body power to the lower crank axle 35 and driving wheel 17;

5) The forearm/hand bars 110 are connected together with a yoke 121, and attached to the yoke is an upper front connecting bridge rod 226;

6) The bottom end of the connecting rod 226 is attached to an upper front crank 227, which can be located just above the front wheel 18, and the back end of the crank 227 is attached to a solid rotatable drive line 229;

7) The rear end of the solid rotatable drive line 229 can be attached to the front end of one of two bevel gears 334a, 334b, the second bevel gear 334b has its teeth meshed into the teeth of the first bevel gear 334a, and this second bevel gear 334b is positioned perpendicular to the first, or front bevel gear 334a;

8) The axle 335 for the back side of the second, or rear, bevel gear 334b may have attached to it a spur gear 336, and meshed with this first spur gear 336 is a second spur gear 337 that is positioned adjacent to the first spur gear 336.

9) Attached to the axle upon which the second, or adjacent spur gear 337 rotates, is one or more sprockets 338, 338a, and onto this sprocket 338 is mounted a chain 340; and 10) The front end of the chain 340 is positioned over the teeth of one of these mid-level sprockets 338, 338a, and the chain's 340 rear end is positioned over the lower rear sprocket's 341 teeth, which is affixed to the crank axle 35.

In applying the forgoing Dual Power components to the rider's bicycling experience, he grasps the hand grips 120 of the forearm/hand bars 110, places his elbows on top of the platforms 122, and then rotationally pulls-up and pushes-down on the front of the forearm/hand bars 110, always using power strokes. Simultaneously he rotates the pedals 11a and 12 with his legs. Because the back of the forearm/hand bars 110 are attached to bearings 109a that rotate over the fulcrum bar 109, the rotational up and down oscillations of the forearm/hand bars 110 cause the yoke 121, and its attached connecting bridge rod 226, to move up and down. Since the bottom end 226b of the connecting bridge rod 226 is attached to the outside end of the crank 227, and the crank's 227 inside end is attached to the rotatable but solid driveline 229, this causes the vertically moving connecting rod 226 to rotate the crank 227 a full 360 degrees with each up and down rotational oscillation of the forearm/hand bars 110.

The 360 degree rotation of the crank 227 then causes the rotatable solid drive line 229, to which the inner end of the connecting rod 226 is attached to the front end of this rotatable drive line 229, to also rotate 360 degrees with each oscillation of the forearm/hand bars 110. As a result of the rear end of the rotatable driveline 229 being connected to the axle of the first, or front, bevel gear 334a, the teeth of this bevel gear 334a also rotate 360 degrees. The teeth of this front bevel gear 334a are meshed into the teeth of a second bevel gear 334b, which is positioned perpendicular to the first, or front, bevel gear 334a. The back side of this second, or rear, bevel gear 334b can have attached to it a chain sprocket 338. Thus as the teeth of these two bevel gears 334a, 334b rotate 360 degrees, this chain sprocket 338 also rotates 360 degrees.

Alternatively, the axle 335 of the second bevel gear 334b may be attached to a first spur gear 336. The first spur gear 336 may have positioned adjacent to it a second spur gear 337. On the back side of the second spur gear 337 may be positioned the mid-level chain sprocket 338, which may have multiple sprockets 338a adjacent to one another. An upper front chain derailleur 339 may be used to move this mid-level chain 340 from the teeth of one chain sprocket 338 to another 338a.

While the front end of the chain 340 is positioned over the teeth of the front sprocket 338, the rear end of the chain 340 is draped over the teeth of a second sprocket 341, called the lower rear sprocket 341, which is attached to the crank axle 35. Thus, as the rider uses his upper body muscles and forearms to pull-up and then push-down with power strokes, jointly and in unison, on the forearm/hand bars 110, the afore-described drive train causes power from his upper body muscles to input torque and rotate the crank axle 35, which in turn rotates the driving wheel 17 of the bicycle 1, through use of standard industry chains 15 and sprockets 14 positioned from the front sprocket 14 and derailleur 15 to the rear cassette 15. This Dual Power drive train may also be used on other vehicles and applications, such as, but not limited to tricycles, human powered vehicles, airplanes, watercraft and the like.

In order to allow steering of the front wheel 18 to the left or right, while the rider is simultaneously pumping his forearm/hand bars 110 vertically and rotationally, the steering function of the turning track 124 and forearm/hand bars 110 must be separate and independent from the vertical and rotational movement of the stationary positioned upper front crank 227. This can be accomplished through the use of a telescoping rod 126, carriage 125 and curved linear rolling track 124. The rolling track 124, or other such device, is attached to the forearm/hand bars 110, and moves laterally and vertically in unison with them. As the turning track 124 is turned to the right or left, its inner surfaces slide over the rollers 125a, which are attached to the carriage 125. The carriage 125 is held in a stationary position, free from lateral movement. However, it can still move vertically up and down, because it is attached to the top of a telescoping rod 126 that moves in and out in unison with the vertical movement of the turning track 124. The base 126a of the telescoping rod 126 is affixed to the head tube 6 of the bike 1, which thereby precludes lateral movement of the carriage 125, even though the forearm/hand bars 110, turning tube 7, and front wheel 18 are turned by the rider to his right or left.

Other vehicles, such as a tricycle may include two front wheels, wherein the steering is configured to turn the two front wheels, which operate with tie rods or the like; a marine vehicle with a rudder or propeller being controlled for steering; a flying vehicle with ailerons, elevators and/or rudder to control steering of the flying vehicle. In these embodiments, the turning track 124 may be coupled to a steering system.

A bicycle 1, or other type of human powered vehicle, airplane, or watercraft utilizing the Dual Power drive train, can be designed in an upright riding geometry, or alternatively, in a recumbent configuration. It is anticipated that for someone schooled in the art of designing drive trains for upright and recumbent bicycles, tricycles, and other such vehicles, the basic components can be modified in minor ways that will not alter the functionality of the current invention.

IV. Dual Power Cycle Drive Train for Configurations II and III

A. Upper Drive System 100 for Both Configurations II and III:

The UPPER FRONT DRIVE SYSTEM 100 for the dual power bicycle 1 consists of a fulcrum rod 109 that is attached to the stem 8 of the bicycle 1. Two forearm/hand bars 110 are perpendicularly mounted at their rear ends 110 to the fulcrum rod 109 through a set of bearings 109a. Turning track 124 is affixed to the forearm/hand bars 110. Platforms 122, upon which the rider places his elbows and forearms, are attached to the top of the forearm/hand bars 110. A carriage 125, with rollers 125a attached to it 125, is located inside the turning track 124. The carriage 125 and its rollers 125a stay in a stationary position relative to the crank 227, while the turning track 124 rotates over them 125a when the rider turns the bike 1 to either his right or left direction. (See FIGS. 7, 8, 8a, 8b, 9, 14 and 15) These components serve two purposes. The first is to provide the rider with four point steering, which the rider uses to make any turn to his right or left by simply turning in unison both his forearms and hands in the desired direction. Four point steering of the forearm/hand bars 110 provides four separate human touch points to steer the front wheel 18, the four human touch points being: 1) left forearm/elbow, 2) right forearm/elbow, 3) left hand and 4) right hand that are all placed onto the forearm/hand bars 110 and grips 120. Thus, in order for the rider to steer the front wheel 18 he must affirmatively and simultaneously move all four touch points in unison toward the direction of his desired turn to the left or right. Because the forearm/hand bars 110 are attached to the fulcrum rod 109, and it 109 is attached to the stem 8, and the stem 8 is attached to the turning tube 7, with the turning tube 7 attached directly to the crown of the front wheel forks 19, any turning of the forearm/hand bars 110 causes the turning tube 7 and front wheel 18 to turn in unison with it 110. (See FIGS. 8,9, 14, and 15) The second purpose is to allow the rider to simultaneously input power from his upper body into rotating the crank axle 35. This occurs when the rider pulls-up and then pushes-down in continuous power strokes on the forearm/hand bars 110 in a rotational arc. Torque is created when the rider rotationally pumps the forearm/hand bars 110 at a rate that is as fast as or faster than the rider is pedaling the crank axle 35 with his legs. The fulcrum rod 109 has on each end a bearing 109a, and attached to each of these bearings 109a is the rear end of one of two forearm/hand bars 110. Thus, as the rider "pulls-up and pushes-down" on the front of the forearm/hand bars 110, the rear end of each of these forearm/hand bars 110 pivots on the fulcrum rod 109 and bearings 109a, causing a cyclical angular displacement of the forearm/hand bars 110 as they move lineally along the path of an arc (see FIGS. 7a-1 thru 7a-4). The path of this arc is determined by a) the radius of the arc, and b) the length of the connecting rod 226, and c) circumference of the crank 227. (See FIGS. 7a-1 thru 7a-4).

The forearm/hand bars 110 are connected together through a turning track 124 that is located below and between both forearm bars 110. Attached on the underside of each of them 110 (See FIG. 7) is the turning track 124. Because it 124 is a single piece, and attached to each side of the forearm/hand bars 110, this turning track 124 also serves the function of a yoke, holding together the two forearm/hand bars 110. Because they 110 are now fastened together, the two forearm/hand bars 110 can: a) only move together in unison, left or right, to steer the cycle 1, or b) move rotationally together "up and down", to provide torque to the crank axle 35. Located inside the turning track 124 is a horizontally stationary carriage 125 (As shown in FIGS. 7, 8, 8a, 8b 9, 14, and 15). The carriage 125 consists of an attachment bracket 123b and several rollers 125a affixed to the carriage 125. The rollers 125a of this carriage 125 fit inside the turning track 124, and permit the turning track 124 to roll over the horizontally stationary carriage 125 as the rider steers the forearm/hand bars 110 to the right or left, as shown in FIGS. 7, 8, 8a, 8b, 9, and 15. However, for someone skilled in the art, turning track designs other than that used in this enablement are anticipated. For example, a curved linear rail may be employed or some other type of rail or curved bar system.

The attachment bracket 123b on the carriage 125 is operatively connected to a horizontally positioned rod 125b on its 125b front end, and to the top of a diagonally positioned telescoping rod 126 on its rear end. In between the carriage 125 and the telescoping rod 126, this same horizontal rod 125b is attached to a vertically mounted connecting bridge rod 226, which has two rod end bearings 226a and 226b on either end of it 226. The purpose of the carriage 125 and its rollers 125a are to permit the rider to steer the front wheel 18 of the cycle 1 to either his right or left, while at the same time pumping the forearm/hand bars 110 "up and down", which continuously provides torque to the crank axle 35 and the rear wheel 17. (See FIGS. 8, 8a, 8b, 9, 14, and 15) The carriage 125 accomplishes this function by having multiple rollers 125a mounted on it 125. Some of the rollers 125a are mounted onto the carriage 125 so that they only touch the interior surface of the turning track's 124 front curve, while the other rollers 125a simultaneously only touch the interior surface of the turning tracks rear curve. (See FIGS. 8, 8a, 8b, 9, 14, and 15) These rollers 125a are always in contact with and ride the interior surfaces of the turning track 124. Thus, whenever the rider steers the cycle 1, by turning his forearm/hand bars 110 to his right or left, these rollers 125a, rotate and permit the turning track 124 to rotate over them. Because the carriage 125 is attached to the top of the horizontally stationary telescoping rod 125c, the carriage 125 always stays in a horizontally stationary position relative to its position with the top tube 2 of the bike 1. This occurs as a result of the base of the telescoping rod 126a being affixed at its base to the bicycle frame—such as the head tube 6. (See FIGS. 8, 8a, 8b, 9, 10, 14, and 15) Because of this unique design, even though the rider is using his forearm/hand bars 110 to turn and steer the front wheel 18 of the bicycle 1 to his left or right, he can simultaneously and rotationally pump his forearm/hand bars 110 "up and down", and thereby continuously input torque into the crank axle 35 from energy expended using muscles located only in his upper body. (See FIGS. 7a-1 thru 7a-4, 8, 8a, 8b, 9, 14, and 15)

The horizontal rod 125b, attached on its front end to the carriage 125 and to the top of the telescoping rod 126 on its rear end, has affixed in between these two end points an upper rod end bearing 226a. Attached to the bottom end of this rod end bearing 226a is the top end of the vertically positioned connecting bridge rod 226. The bottom end of this connecting bridge rod 226 has attached to it a lower rod end bearing 226b. The bottom end of the lower rod end bearing 226b is affixed to the outer end of the crank 227. The inner end of the crank 227 is attached to a solid drive line 229 that will rotate. (See FIGS. 7a-1 thru 7a-4, 9, 14, and 15) Thus, as the rider rotationally pulls-up and pushes-down on the forearm/hand bars 110, this causes the connecting bridge rod 226, to also move in unison up and down. Because the inner end of the crank 227 is affixed to a stationary positioned solid drive line 229, the up and down movement of the connecting bridge rod 226 causes the crank 227 to rotate in unison with both the bridge rod 226 and the oscillating forearm/hand bars 110. The drive line 229, attached on its front end to the inner end of the crank 227, then also rotates in concert with the rotation of the crank 227. (See FIGS. 7a-1 thru 7a-4, 9, 14, and 15) A solid rod or tube, used for the horizontal drive line 229, is connected on its rear end with a bevel gear 334a or 445a, which is positioned near or inside the top of the down tube 3. The reason that the solid horizontal drive line 229 is able to be connected to the upper front crank 227 on its 229 front end and bevel gear 334a or 445a on its rear end, is because it 229 is positioned in such a way that it 229 traverses a gap between the crown in the forks 19 and the top of the front wheel 18 and tire 6. (See FIGS. 7, 9, 10, 14, 15, and 16) Normally, the use of a solid drive line 229 in this configuration would preclude the rider from being able to turn the bicycle 1 to the right or left because the solid drive line 229 is not flexible, and will not bend with the left or right directional steering of the front wheel 18.

The solution to this problem is to make the front wheel 18 steering function independent from the rider's vertical pumping of his forearm/hand bars 110 as he provides torque to the driving wheel 17. One means for separating and making independent the turning function from the forearm/hand power function is by use of the turning track 124, carriage 125 affixed to rollers 125a, telescoping rod 126, and connecting bridge rod 226 attached to the stationary positioned crank 227 affixed to the front end of the solid drive line 229, as shown in FIGS. 7a-1 thru 7a-4, 8, 8a, 8b, 9, 14, and 15.

Another important set of component parts are the cam 230, cam follower 231, spring set and its housing 232. As the rider pushes and pulls his pumping forearm/hand bars 110, he is rotating both the crank 227 and horizontal rotating rod 229. The current invention utilizes cam 230, cam follower 231, and cam follower spring set 232 to push the upper front crank 227 over its 227 top and bottom dead center positions. (See FIGS. 9, 10, 14, and 15) During each revolution of crank axle 35 and upper front crank 227, the upper front crank 227 may stop rotating due to it 227 having been rotated into its 227 top or bottom dead center positions at 0 and 180 degrees, respectively. (See FIGS. 7a1-7a-4, 10, 14 and 15) When this occurs, the forearm/hand bars 110 cannot be moved either up or down. In order to ensure a complete 360 degree rotation of the crank 227, and a corollary complete up and down oscillation of the forearm/hand bars 110 by the rider, the crank 227 must be pushed over its 227 top and bottom dead center positions. The reason for this is because the crank's 227 rotational momentum is not always sufficient to push it 227 over the crank's 227 top and bottom dead center positions. Thus, this function is accomplished through use of the cam 230, cam follower 231, and spring mechanism 232 attached to the cam follower 231, as illustrated in FIGS. 7a1-7a4, 9, 10, 14 and 15).

Figure 4:
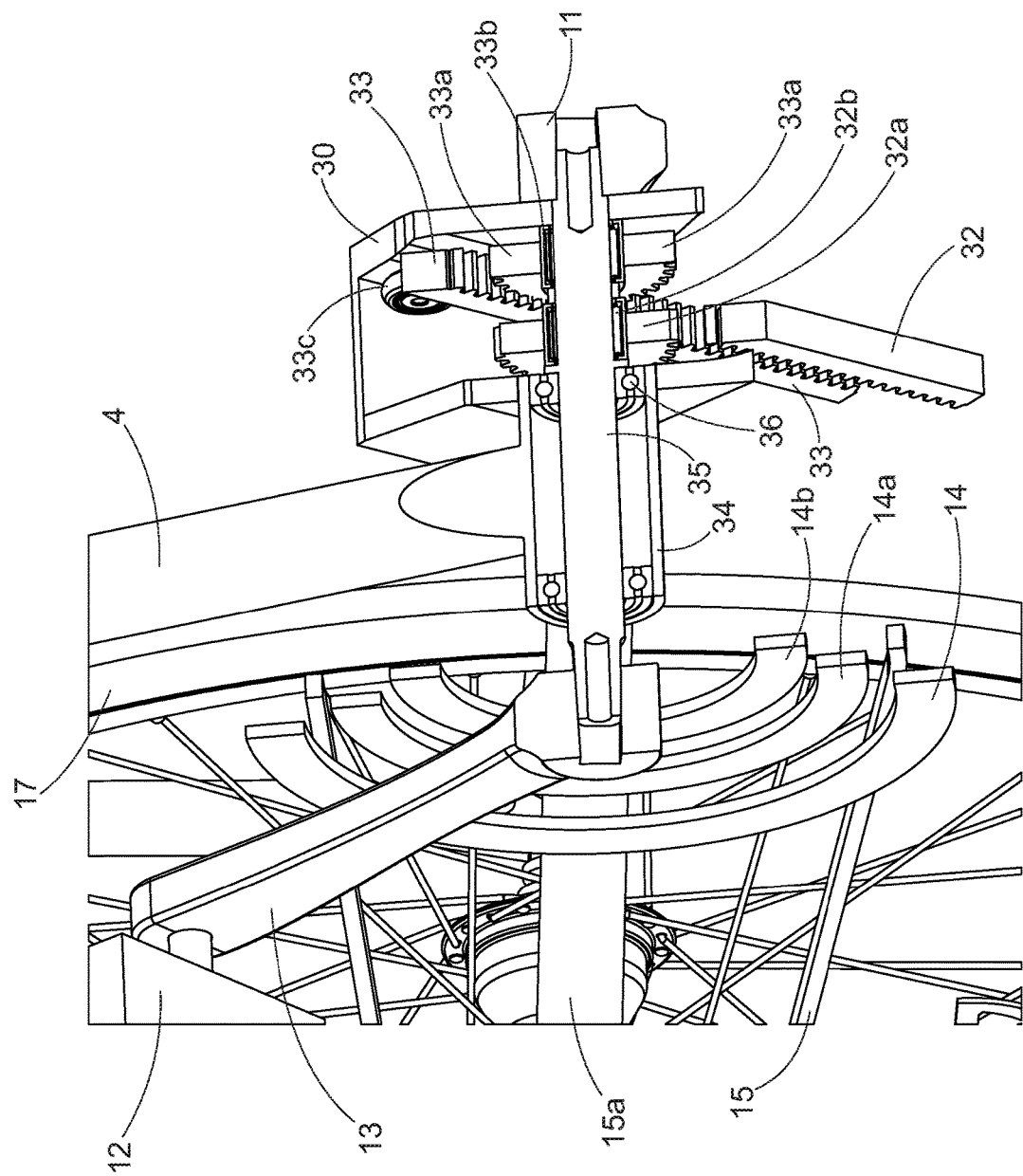

The cam 230 may have the general shape of an ellipse. The cam follower 231 and spring-loaded cam follower tower 232 are designed such that the spring 232 will be in its 232 most upward and loaded position when cam follower 231 is just cresting the shoulder on the circumference of cam 230 and ready to drop over its 230 circumferential shoulder. As the cam follower 231 drops over the shoulder on the circumferential surface of cam 230, the energy loaded spring mechanism 232 releases its 232 stored energy and forces the cam follower 231, to which it 232 is attached, to travel and rotate over the circumferential surface of the cam 230, causing it 231 to continue its 231 full run over the geometric circumferential surface of the cam 230 to the next cam shoulder 230, located 180 degrees away from the first cam shoulder 230. (See FIGS. 9, 10, 14, 15, and 16) During this forced rotation of the cam 230, it 230 causes the horizontal solid drive line 229 to rotate, which in turn causes the upper front crank 227 to be mechanically pushed over its 227 top and bottom dead center positions at 0 and 180 degrees. Thus, upper front crank 227 is able to complete its 360 degree rotation as shown in FIGS. 7a-1 thru 7a-4.

B. Middle Drive System 300 Applicable Only to Configuration II

Figure 6:
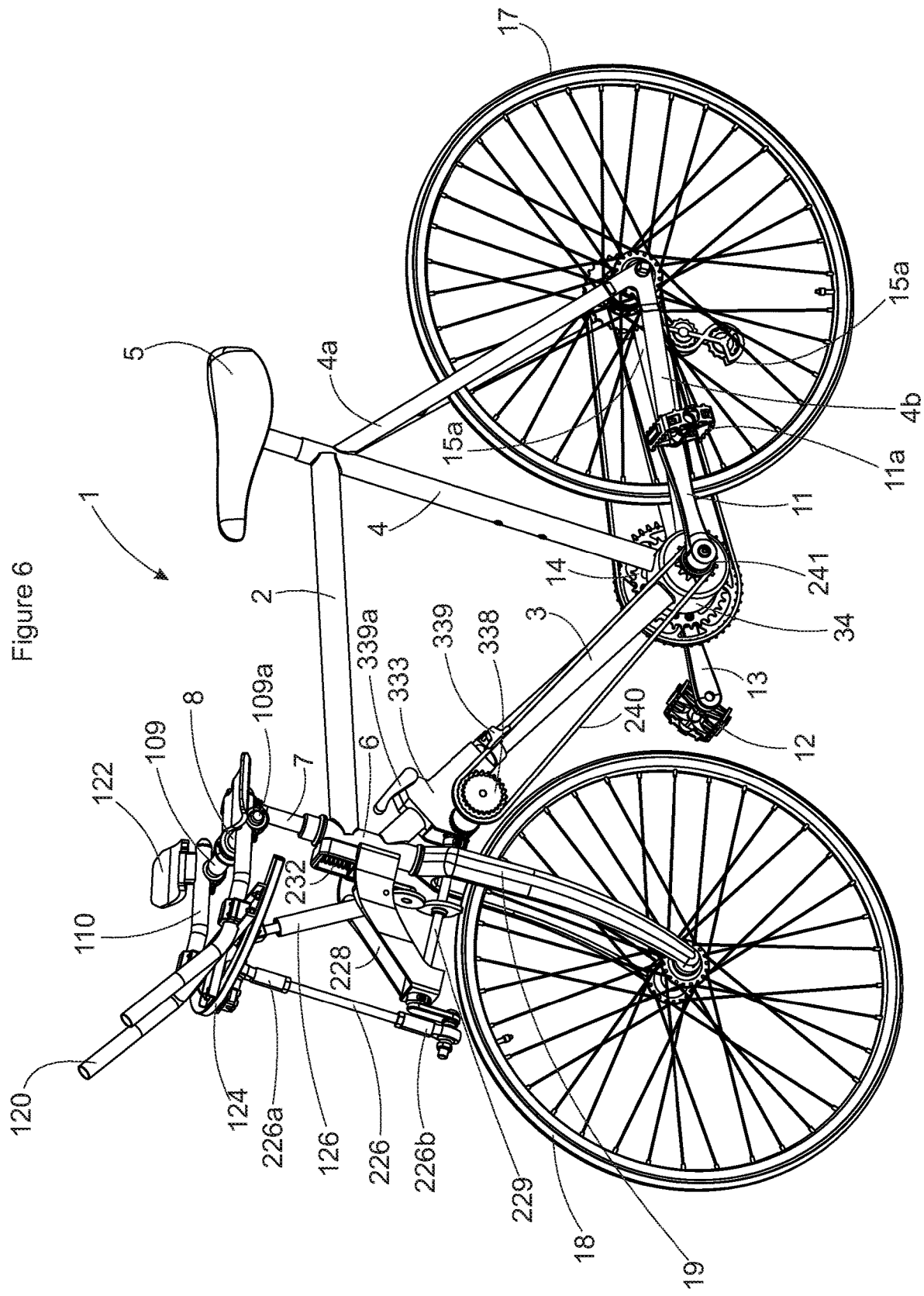
FIG. 6 is an oblique frontal view of an example of a Dual Power Bicycle, shown in Configuration II, as described herein, and in which the rider is able to use: a) his legs by themselves, or b) both his arms and legs at the same time to power the bicycle when designed according to the enablement of this invention. In Configurations II and III, the two different drives that comprise the bicycle's drive system consist of a) Upper Front Drive System 100, that is applicable for both Configurations II and III, Middle Drive System 200 for Configuration II, Middle Drive System 300 for Configuration III, and Lower Rear Drive System 400 applicable to both Configurations II and III.
Figure 11:
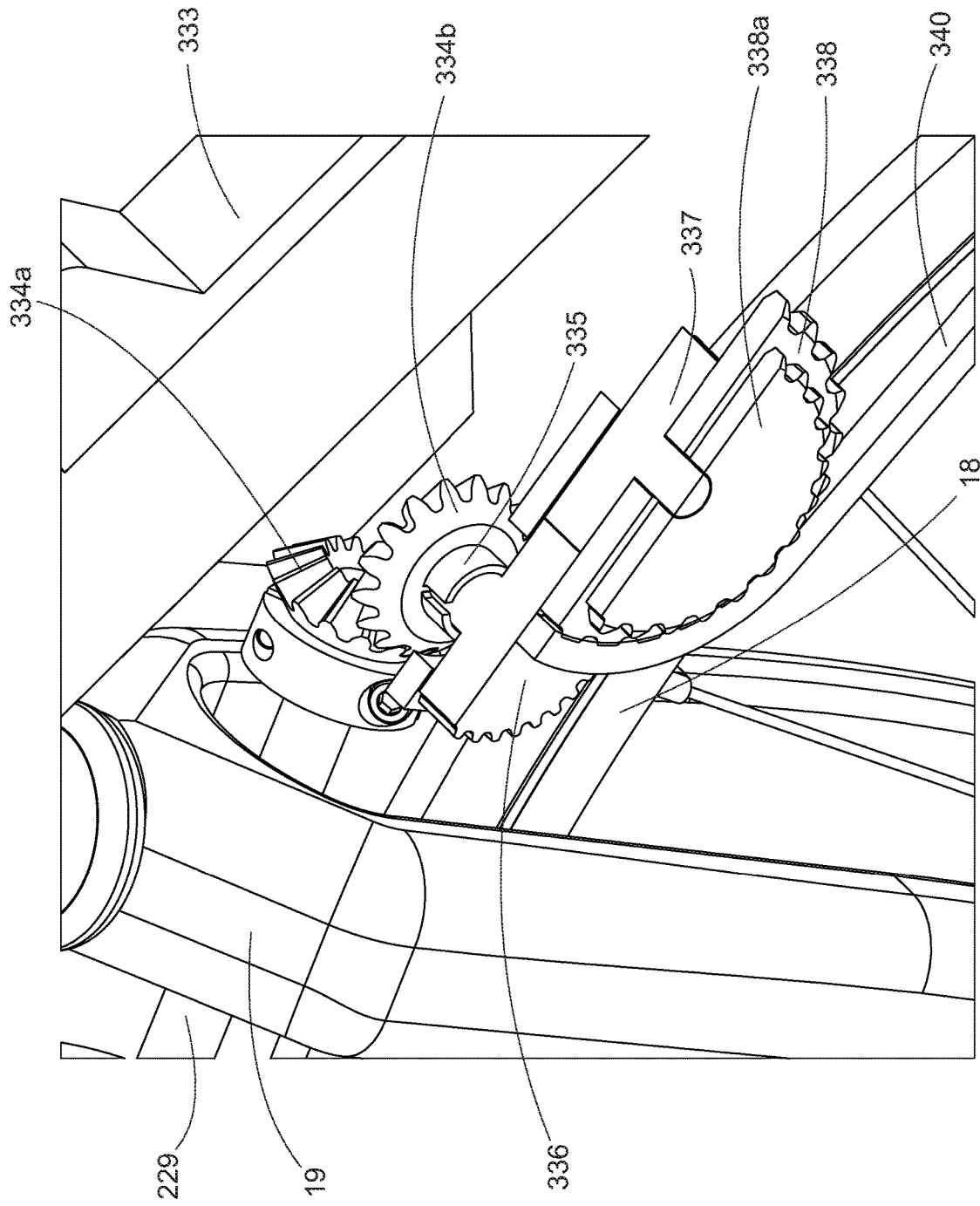
FIG. 11 is an oblique view of Configuration II from the rider's left side and shows the component parts used in the upper section of Middle Drive System 300 for Configuration II. These include two bevel gears and their bearings, two spur gears, upper front sprockets and chain.

The rear end of solid drive line 229 engages with the front axle of a set of bevel gears 334a and 334b positioned near the top end of down tube 3. As this drive line 229 rotates, it 229 causes the set of bevel gears 334a and 334b to rotate in unison with it 229, as shown in FIGS. 6 and 11. Bevel gear 334b has attached on the end of it an axle 335, which axle 335 is connected to a spur gear 336, as shown in FIG. 11. Spur gear 336 has gear teeth positioned around its 336 circumference; a second spur gear 337, as shown in FIG. 11, also has gear teeth located around its 337 circumference. The circumferential gear teeth on spur gear 336 are meshed into the circumferentially positioned gear teeth on spur gear 337. (See FIG. 11) Thus, when bevel gear 334a is rotated from the rotation of rotating rod 229, it 334a rotates bevel gear 334b, which in turn rotates spur gear 336. The rotation of spur gear 336 then rotates spur gear 337. Attached to the back side of this upper spur gear 337, are upper front chain mid-level sprockets 338 and 338a, which rotate in unison with spur gear 337, to which it 338 is attached. (See FIG. 11).

Utilizing the design of Configuration II, the Dual Power bicycle 1 gives the rider the ability to vary the number of oscillations per minute that he uses in pumping his forearm/hand bars 110. It 1 accomplishes this through the use of multiple sprockets 338 and 338a. Chain 340 fits over any of sprockets 338 or 338b. The mechanism used to transfer chain 340 from one sprocket 338 to the next 338a is called an upper front derailleur 339. (See FIG. 9) A cable is attached to upper front derailleur 339. A shift lever 339a is attached to a controller cable. Thus, when the rider moves shift lever 339a, it causes a like movement of the cable to which it is attached. Because this cable is attached to the upper front left derailleur 339, the movement of cable lever 339a causes a movement in the upper front derailleur 339, which then moves the chain 340 onto the desired sprocket 338 or 338a. (See FIG. 9) This ability, modulating the rate of forearm/hand bar 110 oscillations, permits the rider to optimize the amount of torque that he is delivering into rotation of the driving wheel 17. At the same time, it affords the rider the most comfortable and efficient use of his legs/feet and forearm/hands 110 to simultaneously power the bicycle 1.

Figure 12:
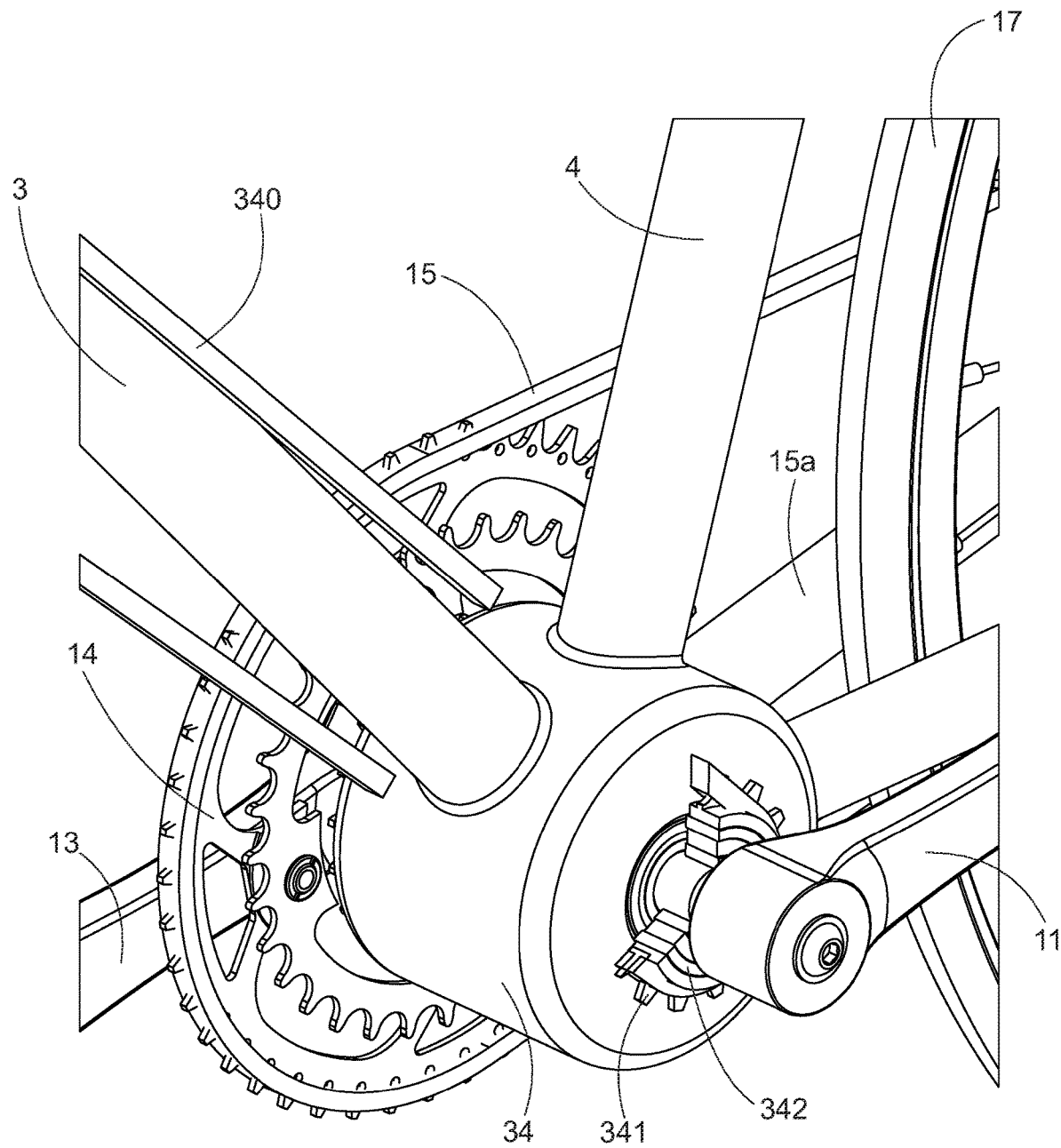
FIG. 12 is an oblique view of Configuration II from the bicycle's left side showing the component parts used in the lower section of Middle Drive System 300.

A chain or belt 340 fits over a set of the teeth around the circumference of sprockets 338 or 338a. The rear end of this chain or belt 340 fits directly over the outer circumferentially located teeth on lower sprocket 341. This sprocket 341 is affixed to crank axle 35, as shown in FIG. 12. Because sprocket 341 is attached directly to crank axle 35, the rotation of sprocket 341 causes the simultaneous rotation of crank axle 35. (See FIG. 12) Because crank axle 35 is operatively connected to driving wheel 17, through a standard set of bicycle chain, sprockets, cassettes, and gears, Dual Power torque provided from the rider's upper body and arms causes crank axle 35 to rotate, which concurrently inputs torque into driving wheel 17, which causes it 17 to rotate and move the rider and bicycle 1 forward. (See FIGS. 1 and 12).

V. Dual Power Cycle Drive Train for Configuration III of the Invention

A. Upper Drive System 100 for Configurations I, II, and III:

All of the preceding Enablement describing Upper Drive System 100 for Configurations I, II and III is adopted and incorporated herein as though set forth fully.

Figure 13:
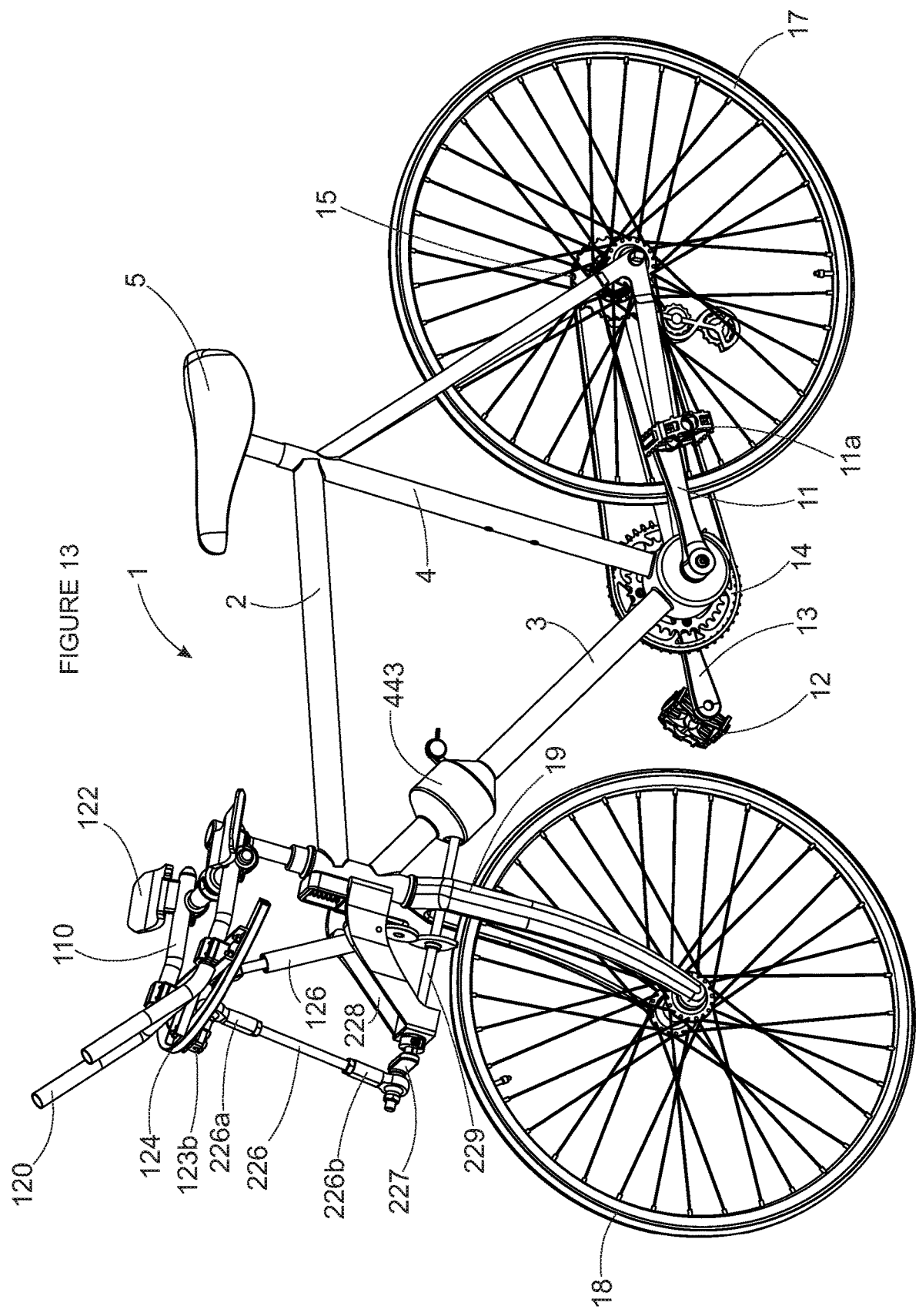
FIGS. 13 through 17 are illustrations of different components and assemblies for Configuration III of the Dual Power Bike.
Figure 14:
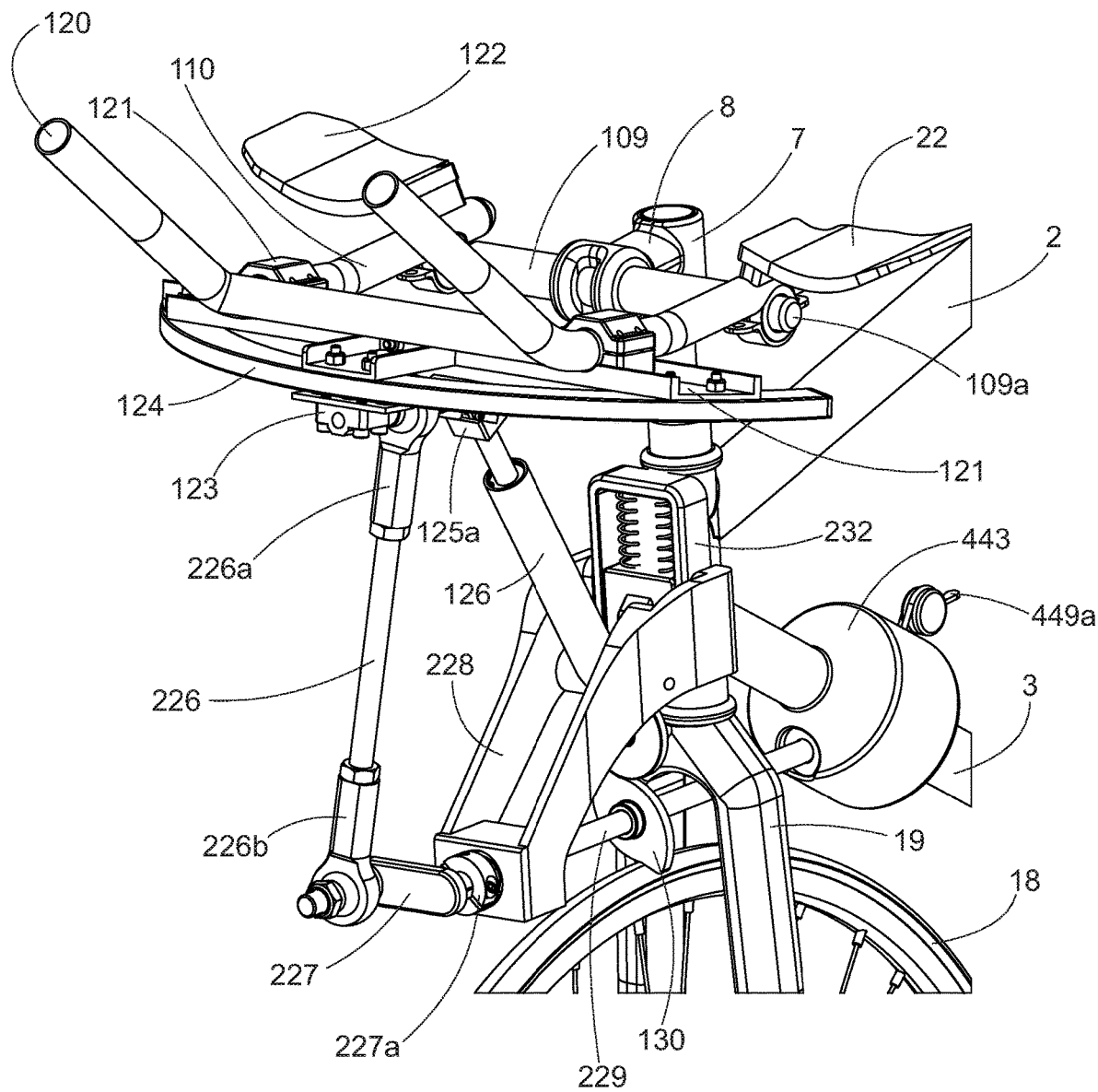
Figure 15:
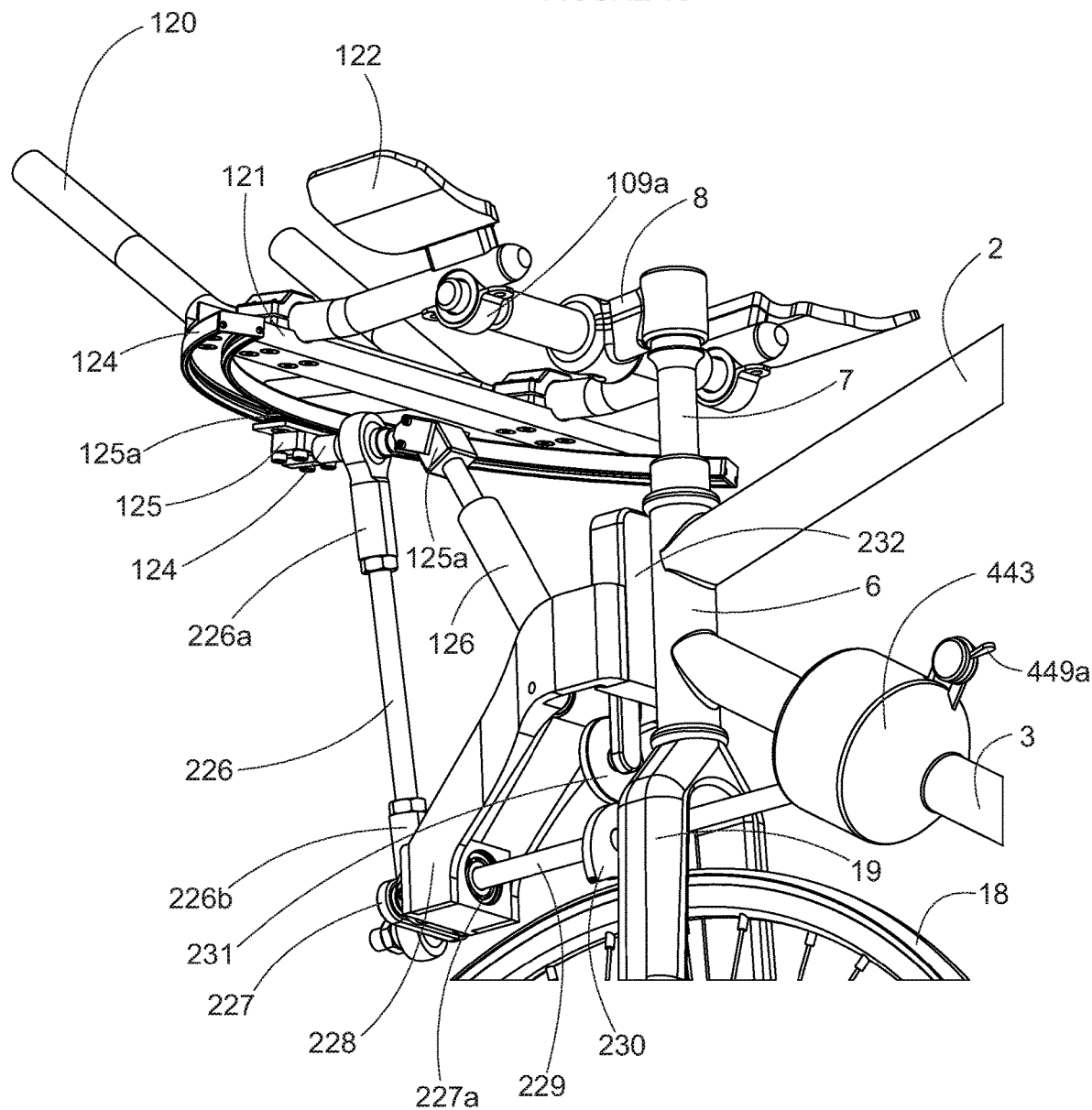
Figure 16:
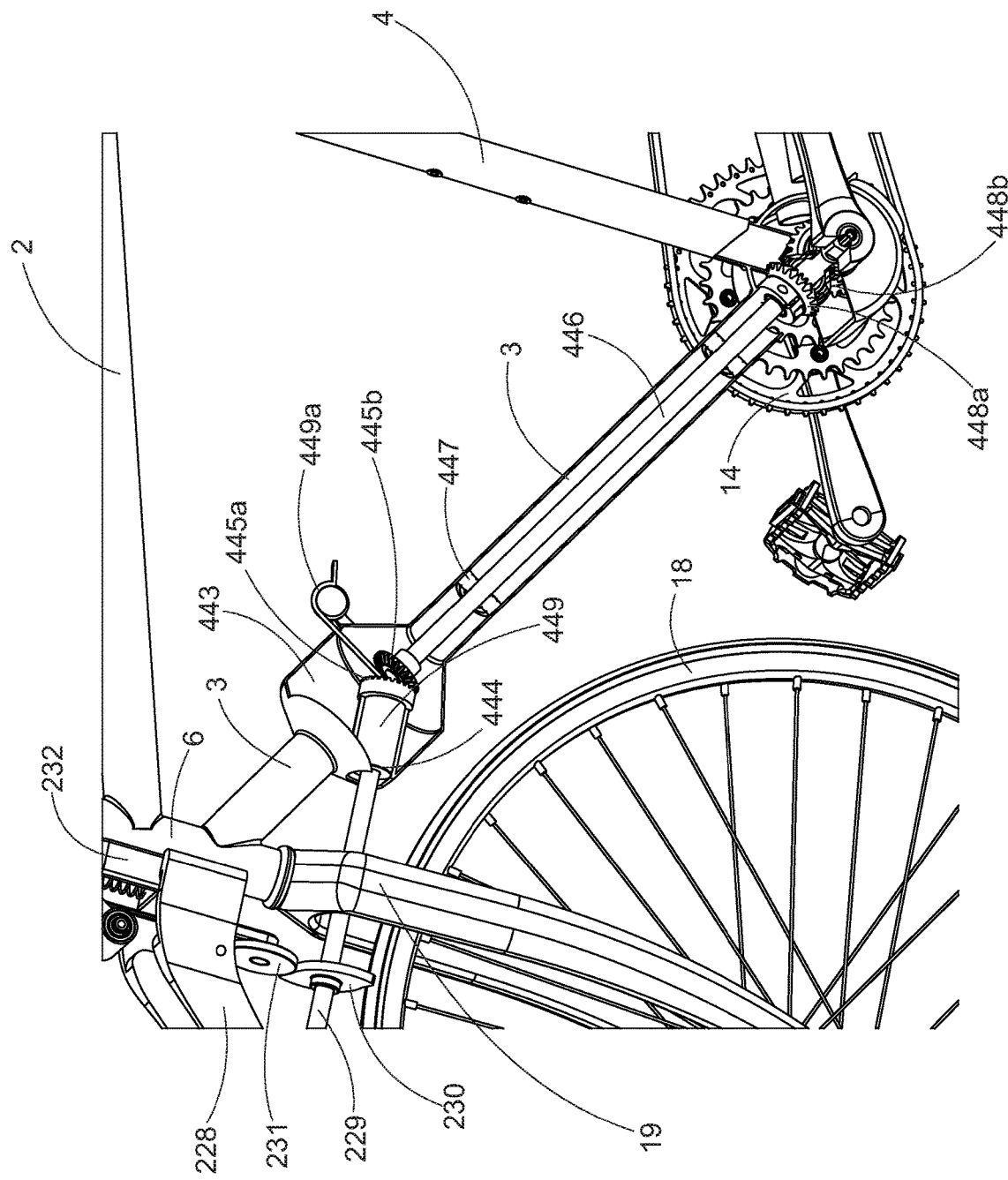
Figure 17:
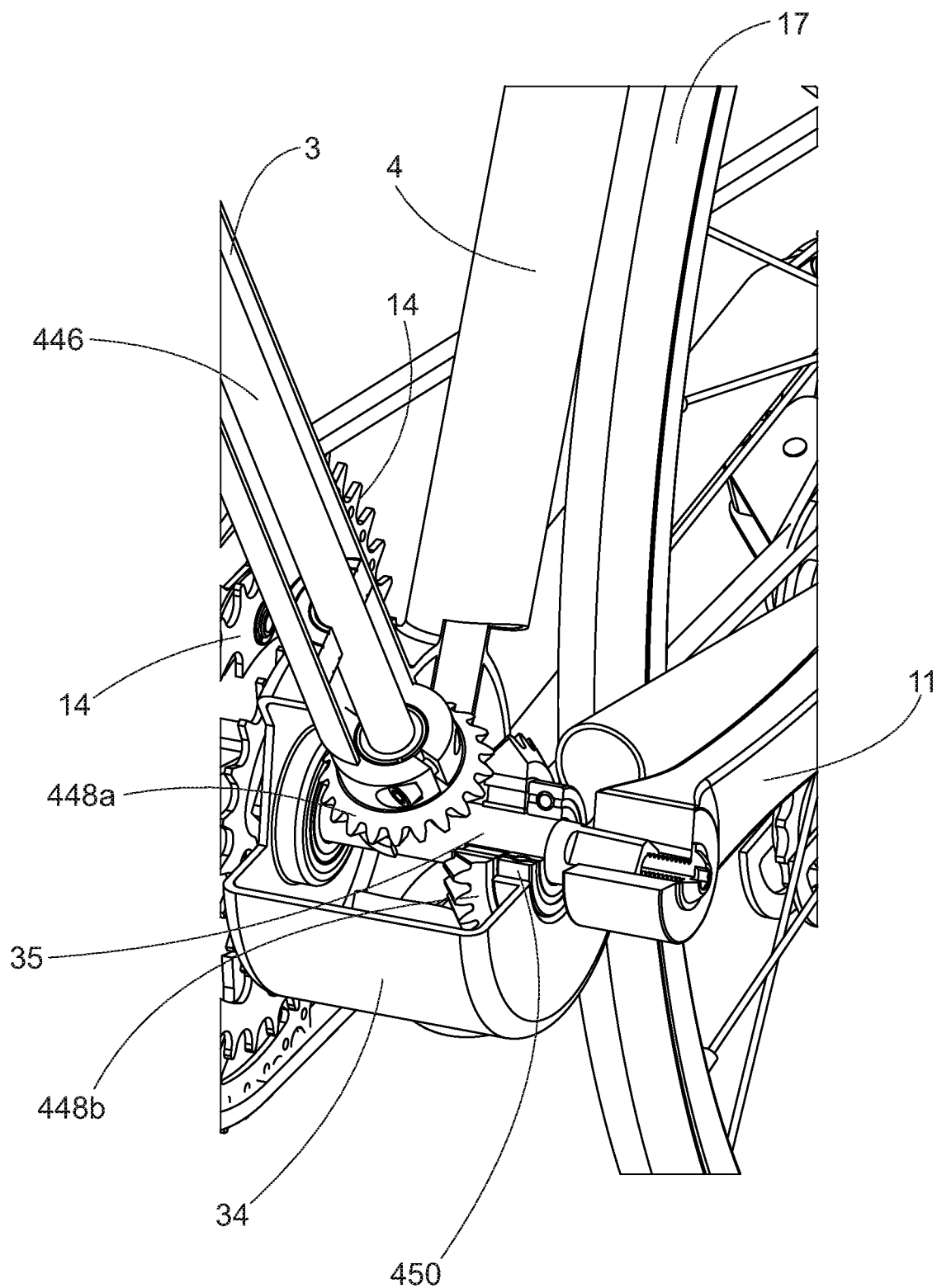

B. Enablement for Middle Drive System 400 Applicable Only to Configuration III of the Dual Power Drive Train The primary differences between Configuration II and Configuration III are found in the use of different components for Middle Drive Systems 300 and 400. For example, the horizontal driveline 229 is positioned in both Middle Drive Systems 300 and 400 so that it traverses through the front wheel 18 and crown of the forks 19, and then immediately attaches to bevel gear 334a in Configuration II, (See FIG. 11). However, in Configuration III, after traversing this same gap between the crown of the forks 19 and the top of the front wheel 18, this same driveline 229 immediately enters into an opening in a cover 443 located at the top of the down tube 3. (See FIG. 13) After traversing through this opening in cover 443, the rear end of it 229 is then connected to bevel gear 445a, and causes it 445a to rotate in unison with the horizontal drive line 229. The teeth from bevel gear 445a are meshed with the teeth of its companion bevel gear 445b. A second rotating drive line 446 is positioned diagonal to drive line 229, and it 446 is attached on its front end to bevel gear 445b. (See FIG. 16) This second rotating drive line 446 traverses inside and parallel with down tube 3, and the rear end of diagonal drive line 446 is attached on its rear end with another set of bevel gears 448a and 448b, which are affixed to crank axle 35. (See FIGS. 16 and 17)

The lower rear end of rotating diagonal drive line 446 is attached to the front end of the axle for bevel gear 448a, whose gears are meshed into those of bevel gear 448b. This bevel gear 448b is positioned and attached to crank axle 35. Thus, as the upper set of bevel gears 445a and 445b, along with diagonal drive line 446, are rotated from turning of the upper front rotating drive line 229, they, 445a, 445b, and 446 cause the lower set of bevel gears 448a and 448b to rotate. Because bevel gear 448b is attached to the crank axle 35, the rotation of bevel gears 448a and 448b cause crank axle 35 to also rotate in unison with them 448a and 448b. (See FIGS. 16 and 17) As a result of energy emanating from the rider's up and down arc-shaped oscillations of his forearm/hand forearm bars 110, and the corresponding rotation of the component parts of the Dual Power drive train described in this Enablement, crank axle 35 is rotated providing torque and power to the drive wheel 17. This permits the rider to have the benefits of Dual Power bicycling. It should be understood that if the rotating diagonal drive line 446 does not have gears coupled thereto to adjust the rate of rotation, then the cam 230 and cam follower 231 may be coupled to the lower crank axle 35.

In the case wherein the Dual Power bicycle 1 provides the rider with the ability to vary the number of oscillations per minute that he uses in pumping his forearm/hand bars 110, a multi speed internal gear hub 449 can be positioned inside down tube 3. An example of such an internal multi-speed gear mechanism is a Sturmey-Archer multi-speed internal gear hub. This internal gear hub 449 may be connected on one of its 449 ends to the rear end of rotating drive line 229, and on its 449 opposite end to bevel gear 445a. The positioning of the internal gears for internal gear hub 449 can be controlled by a small cable that protrudes out of its 449 rear end, adjacent to the diagonally installed bevel gear 445b inside the down tube 3. This cable travels from inside the internal multi-gear hub 449, through the center of bevel gear 445a, to a lever 449a located outside of the down tube 3, and controlled by the rider through movement of the lever 449a, which moves the chain connecting it 449a with the internal hub gears 449. (See FIG. 16).

On demand Dual Power riding is made possible through the installation of a one-way bearing 450. In Configuration III, the one-way bearing 450 is attached to the crank axle 35 on its inner race. The outer race is attached to the interior surface of the back of bevel gear 448b. (See FIG. 17) If the rider is pedaling the crank axle 35 with his legs at a faster RPM than he is pumping the forearm/hand bars 110 to turn the crank axle 35, then the energy from pumping his forearm/hand bars 110 will not input any torque into the rotation of the crank axle 35. On the other hand, if the rider is pumping his forearm/hand bars 110 and rotating the crank axle 35 at a faster RPM than he is pedaling the pedals 11a and 12 to turn the crank axle 35, then all of the energy to rotate the crank axle 35 will be inputted from the rider's muscles in his upper body and arms as he rotationally pumps forearm/hand bar 110. In the case where the rider is causing the crank axle 35 to rotate at the same RPM, from both oscillating forearm/hand bars 110 and use of his legs to rotate the pedals, then both the rider's upper body and lower body muscles will be simultaneously inputting torque to cause the rotation of the crank axle 35. And in the case where the rider is pedaling the crank axle with just his legs at a faster rate than he is rotationally oscillating his forearm/hand bars 110, all of the torque used in moving the bike 1 will be from his legs. (See FIGS. 16 and 17)

Some government and industry regulations require that the bicycle front wheel 18 be able to steer to its 18 right and left direction at a minimum of 45 degrees from its 18 center or straight forward position. Most currently designed front forks 19 will not permit the front wheel 18 to steer 45 degrees in combination with using a Dual Power drive train as enabled herein. The reason for this is that currently designed front forks 19 generally measure 3" to 4" at the crown, and 4" to 5" at the bottom, where they 19 attach to the front wheel 18 axle. The currently used 3" to 4" width at the crown in the forks 19 is too narrow for use with a Dual Power drive train and still be able to make a 45 degree turn. The reason for this is the top interior side of the front forks 19 will touch and conflict with the solid horizontal drive line 229 before the front wheel 18 has turned 45 degrees to its 18 right or left from its 18 center position. Thus, when a bicycle 1 or other vehicle uses a Configuration II or III Dual Power drive train, its front forks 19 will need to be wide enough at their crown to permit the forks 19 to steer the front wheel 18 at least 45 degrees to its 18 right or left before one of the forks 19 touches, or conflicts with, the horizontal solid drive line 229. The wider that the diameter of the solid drive line 229 is will require a larger opening in the crown of the front forks 19 than will a more narrow solid drive line 229. The bottom of the forks 19 can continue to accommodate currently used front wheel 18 axle widths.

In conjunction with the need for the front forks 19 to be wide enough at their crown to avoid conflicting with the solid drive line 229 in a 45 degree turn, the circumference of the turning track arc 124 needs to be sufficiently sized to accommodate both the 45 degree steering requirement as well as the additional length to accommodate the width of the carriage 125 and its rollers 125a during a left or right turn.

Although the above-preferred embodiments have been illustrated and described, persons skilled in the art will recognize that many changes to the specific embodiments disclosed above could be made without departing from the spirit of the invention. Therefor the invention is not limited thereto except insofar as such limitations are included in the following claims and allowable functional equivalents thereof.

The invention claimed is:

1. A dual powered propulsion system for use with a human powered vehicle, the system comprising:
   a crank axle having pedals coupled to the crank axle to supply rotational power to the crank axle by rotational pedaling motion;
   a connecting rod, wherein a front end of the connecting rod is operatively coupled to forearm bars and a rear end of the connecting rod coupled to a splitter, wherein the splitter is coupled to a first rack and a second rack;
   a first pinion gear coupled to the crank axle with a first one-way bearing; and
   a second pinion gear coupled to the crank axle with a second one-way bearing, wherein the first pinion gear rotates in a direction opposite the second pinion gear, wherein:
      the first rack is coupled below and engages the first pinion gear and the second rack is coupled above and engages the second pinon gear;
      the first and second racks oscillate back and forth from movement by the connecting rod in response to movement of the forearm bars in an up power stroke and a down power stroke; and
      the first pinion gear and the second pinion gear supply rotational power to the crank axle in a single direction in response to the oscillation of the first and second racks and the operation of the respective one-way bearings independent of the rotation power supplied to the crank axle by the pedals.

2. The system of claim 1, further comprising rollers coupled to the vehicle, wherein the rollers engage the first rack to maintain engagement with the first pinion gear and the rollers engage the second rack to maintain engagement with the second pinion gear, or rack support casings supporting the first rack and the second rack to maintain engagement with the first pinion gear and the second pinion gear respectively as the first rack travels over the first pinion gear and the second rack travels over the second pinion gear.

3. The system of claim 2, wherein the rollers or the rack support casings are coupled to the vehicle with a housing to maintain the rollers or rack support casings in fixed positions.

4. The system of claim 1, further comprising a turning track operatively coupled to the forearm bars and a carriage, wherein the carriage is operatively coupled to the connecting rod.

5. The system of claim 4, wherein the carriage further comprises roller devices coupled to the carriage over which the turning track travels to the right or left.

6. The system of claim 5, further comprising a telescoping rod coupled to a frame of the vehicle on one end and operatively coupled to the carriage on the other end, wherein the telescoping rod allows the carriage to move up and down in response to movement of the forearm bars in up and down power strokes while prohibiting side to side movement of the carriage.

7. The system of claim 6, wherein the turning track travels over the roller devices on the carriage and allows the forearm bars to turn a front wheel or wheels of the vehicle left and right and simultaneously move the carriage up and down in response to movement of the forearm bars in up and down power strokes.

8. The system of claim 7, wherein the connecting rod oscillates back and forth, and up and down, in response to movement of the carriage up and down within a vertical plane.

9. The system of claim 6, further comprising elbow platforms coupled to the forearm bars, each elbow platform comprising a manual locking mechanism for coupling an elbow to the elbow platform.

10. The system of claim 9, further comprising quick release bindings coupled to each elbow platform, wherein the quick release bindings are configured to releasably couple the elbow platform to the forearm bars.

11. The system of claim 9, wherein the forearm bars and elbow platforms operatively provide four point steering of the bicycle.

* * * * *